(12) United States Patent
Osborne et al.

(10) Patent No.: US 9,819,863 B2
(45) Date of Patent: Nov. 14, 2017

(54) WIDE FIELD OF VIEW ARRAY CAMERA FOR HEMISPHERIC AND SPHERICAL IMAGING

(71) Applicant: QUALCOMM Incorporated, San Diego, CA (US)

(72) Inventors: Thomas Wesley Osborne, San Diego, CA (US); Todor Georgiev Georgiev, Sunnyvale, CA (US); Sergiu Radu Goma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 14/739,311

(22) Filed: Jun. 15, 2015

(65) Prior Publication Data
US 2015/0373279 A1 Dec. 24, 2015

Related U.S. Application Data

(60) Provisional application No. 62/015,329, filed on Jun. 20, 2014.

(51) Int. Cl.
*H04N 5/225* (2006.01)
*H04N 5/232* (2006.01)
(Continued)

(52) U.S. Cl.
CPC ..... *H04N 5/23238* (2013.01); *G02B 13/0075* (2013.01); *G02B 13/06* (2013.01);
(Continued)

(58) Field of Classification Search
CPC .... G02B 13/0075; G02B 13/06; G03B 17/17; G03B 35/08; G03B 37/04; H04N 13/0242;
(Continued)

(56) References Cited

U.S. PATENT DOCUMENTS 3,698,803 A 10/1972 Watanuki
4,114,171 A 9/1978 Altman
(Continued)

FOREIGN PATENT DOCUMENTS

CN 101201459 A 6/2008
CN 101571666 A 11/2009
(Continued)

OTHER PUBLICATIONS

Arican, et al., "Intermediate View Generation for Perceived Depth Adjustment of Sterio Video", Mitsubishi Electric Research Laboratories, http://www.merl.com, TR2009-052, Sep. 2009; 12 pages.
(Continued)

*Primary Examiner* — Chia-Wei A Chen

(57) ABSTRACT

Aspects relate to methods and systems for producing ultra-wide field of view images. In some embodiments, an image capture system for capturing wide field-of-view images comprises an aperture, a central camera positioned to receive light through the aperture, the center camera having an optical axis, a plurality of periphery cameras disposed beside the central camera and pointed towards a portion of the optical axis of the center camera, the plurality of cameras arranged around the center camera, and a plurality of extendible reflectors. The reflectors are configured to move from a first position to a second position and have a mirrored first surface that faces away from the optical axis of the center camera and a second black surface that faces towards the optical axis of the center camera, the plurality of periphery cameras arranged around the center camera.

30 Claims, 15 Drawing Sheets

(51) Int. Cl.
*G02B 13/00* (2006.01)
*G02B 13/06* (2006.01)
*H04N 5/247* (2006.01)
*G03B 17/17* (2006.01)
*G03B 37/04* (2006.01)
*H04N 13/02* (2006.01)
*G03B 35/08* (2006.01)

(52) U.S. Cl.
CPC ............ *G03B 17/17* (2013.01); *G03B 35/08* (2013.01); *G03B 37/04* (2013.01); *H04N 5/2254* (2013.01); *H04N 5/2258* (2013.01); *H04N 5/2259* (2013.01); *H04N 5/247* (2013.01); *H04N 13/0242* (2013.01)

(58) Field of Classification Search
CPC .. H04N 5/2254; H04N 5/2258; H04N 5/2259; H04N 5/23238; H04N 5/247
USPC .......................... 348/218.1, 373, 374, 211.11
See application file for complete search history.

(56) References Cited

U.S. PATENT DOCUMENTS

| | | |
|---|---|---|
| 4,437,745 A | 3/1984 | Hajnal |
| 4,639,586 A | 1/1987 | Fender et al. |
| 4,740,780 A | 4/1988 | Brown et al. |
| 4,751,570 A | 6/1988 | Robinson |
| 5,012,273 A | 4/1991 | Nakamura et al. |
| 5,016,109 A | 5/1991 | Gaylord |
| 5,063,441 A | 11/1991 | Lipton et al. |
| 5,142,357 A | 8/1992 | Lipton et al. |
| 5,194,959 A | 3/1993 | Kaneko et al. |
| 5,207,000 A | 5/1993 | Chang et al. |
| 5,231,461 A | 7/1993 | Silvergate et al. |
| 5,243,413 A | 9/1993 | Gitlin et al. |
| 5,313,542 A | 5/1994 | Castonguay |
| 5,475,617 A | 12/1995 | Castonguay |
| 5,506,913 A | 4/1996 | Ibison et al. |
| 5,539,483 A | 7/1996 | Nalwa |
| 5,606,627 A | 2/1997 | Kuo |
| 5,614,941 A | 3/1997 | Hines |
| 5,640,222 A | 6/1997 | Paul |
| 5,642,299 A | 6/1997 | Hardin et al. |
| 5,686,960 A | 11/1997 | Sussman et al. |
| 5,721,585 A | 2/1998 | Keast et al. |
| 5,734,507 A | 3/1998 | Harvey |
| 5,745,305 A | 4/1998 | Nalwa |
| 5,760,846 A | 6/1998 | Lee |
| 5,793,527 A | 8/1998 | Nalwa |
| 5,903,306 A | 5/1999 | Heckendorn et al. |
| 5,926,411 A | 7/1999 | Russell |
| 5,990,934 A | 11/1999 | Nalwa |
| 6,111,702 A | 8/2000 | Nalwa |
| 6,115,176 A | 9/2000 | Nalwa |
| 6,128,143 A | 10/2000 | Nalwa |
| 6,141,034 A * | 10/2000 | McCutchen ............ G02B 27/22 348/36 |
| 6,141,145 A | 10/2000 | Nalwa |
| 6,144,501 A | 11/2000 | Nalwa |
| 6,195,204 B1 | 2/2001 | Nalwa |
| 6,219,090 B1 | 4/2001 | Nalwa |
| 6,285,365 B1 | 9/2001 | Nalwa |
| 6,356,397 B1 | 3/2002 | Nalwa |
| 6,421,185 B1 | 7/2002 | Wick et al. |
| 6,611,289 B1 | 8/2003 | Yu et al. |
| 6,628,897 B2 | 9/2003 | Suzuki |
| 6,650,774 B1 | 11/2003 | Szeliski |
| 6,700,711 B2 | 3/2004 | Nalwa |
| 6,701,081 B1 | 3/2004 | Dwyer et al. |
| 6,768,509 B1 | 7/2004 | Bradski et al. |
| 6,775,437 B2 | 8/2004 | Kazarinov et al. |
| 6,782,137 B1 | 8/2004 | Avinash |
| 6,798,406 B1 | 9/2004 | Jones et al. |
| 6,809,887 B1 | 10/2004 | Gao et al. |
| 6,850,279 B1 | 2/2005 | Scherling |
| 6,855,111 B2 | 2/2005 | Yokoi et al. |
| 6,861,633 B2 | 3/2005 | Osborn |
| 6,862,364 B1 | 3/2005 | Berestov |
| 6,992,700 B1 | 1/2006 | Sato et al. |
| 7,006,123 B2 | 2/2006 | Yoshikawa et al. |
| 7,039,292 B1 | 5/2006 | Breiholz |
| 7,084,904 B2 | 8/2006 | Liu et al. |
| 7,116,351 B2 * | 10/2006 | Yoshikawa ............ G02B 13/06 348/36 |
| 7,215,479 B1 | 5/2007 | Bakin |
| 7,253,394 B2 | 8/2007 | Kang |
| 7,271,803 B2 * | 9/2007 | Ejiri ................... H04N 13/0278 345/427 |
| 7,336,299 B2 | 2/2008 | Kostrzewski et al. |
| 7,612,953 B2 | 11/2009 | Nagai et al. |
| 7,710,463 B2 | 5/2010 | Foote |
| 7,805,071 B2 | 9/2010 | Mitani |
| 7,817,354 B2 | 10/2010 | Wilson et al. |
| 7,893,957 B2 | 2/2011 | Peters et al. |
| 7,961,398 B2 | 6/2011 | Tocci |
| 7,978,222 B2 | 7/2011 | Schneider |
| 8,004,557 B2 | 8/2011 | Pan |
| 8,098,276 B2 | 1/2012 | Chang et al. |
| 8,115,813 B2 * | 2/2012 | Tang ..................... G03B 19/07 348/159 |
| 8,139,125 B2 * | 3/2012 | Scherling ............ H04N 5/2254 348/231.99 |
| 8,228,417 B1 | 7/2012 | Georgiev et al. |
| 8,267,601 B2 | 9/2012 | Campbell et al. |
| 8,284,263 B2 | 10/2012 | Oohara et al. |
| 8,294,073 B1 | 10/2012 | Vance et al. |
| 8,356,035 B1 | 1/2013 | Baluja et al. |
| 8,400,555 B1 | 3/2013 | Georgiev et al. |
| 8,442,392 B2 | 5/2013 | Ollila et al. |
| 8,482,813 B2 | 7/2013 | Kawano et al. |
| 8,791,984 B2 | 7/2014 | Jones et al. |
| 8,836,693 B2 | 9/2014 | Katano |
| 8,928,988 B1 | 1/2015 | Ford et al. |
| 8,988,564 B2 | 3/2015 | Webster et al. |
| 9,049,375 B2 | 6/2015 | Wade et al. |
| 9,055,208 B2 | 6/2015 | Kim |
| 9,185,296 B2 | 11/2015 | Wade et al. |
| 9,264,610 B2 | 2/2016 | Duparre |
| 9,294,672 B2 | 3/2016 | Georgiev et al. |
| 9,316,810 B2 | 4/2016 | Mercado |
| 9,332,188 B2 | 5/2016 | Takei et al. |
| 9,386,222 B2 | 7/2016 | Georgiev et al. |
| 9,541,740 B2 | 1/2017 | Georgiev et al. |
| 9,549,107 B2 | 1/2017 | Georgiev et al. |
| 9,609,210 B2 | 3/2017 | Djordjevic et al. |
| 2001/0028482 A1 | 10/2001 | Nishioka |
| 2002/0070365 A1 | 6/2002 | Karellas |
| 2002/0136150 A1 | 9/2002 | Mihara et al. |
| 2003/0024987 A1 | 2/2003 | Zhu |
| 2003/0034395 A1 | 2/2003 | Tsikos et al. |
| 2003/0038814 A1 | 2/2003 | Blume |
| 2003/0214575 A1 | 11/2003 | Yoshikawa |
| 2004/0021767 A1 | 2/2004 | Endo et al. |
| 2004/0051805 A1 | 3/2004 | Yoshikawa et al. |
| 2004/0066449 A1 | 4/2004 | Givon |
| 2004/0105025 A1 | 6/2004 | Scherling |
| 2004/0183907 A1 | 9/2004 | Hovanky et al. |
| 2004/0195492 A1 | 10/2004 | Hsin |
| 2004/0246333 A1 | 12/2004 | Steuart et al. |
| 2004/0263611 A1 | 12/2004 | Cutler |
| 2005/0053274 A1 | 3/2005 | Mayer et al. |
| 2005/0057659 A1 | 3/2005 | Hasegawa |
| 2005/0081629 A1 | 4/2005 | Hoshal |
| 2005/0111106 A1 | 5/2005 | Matsumoto et al. |
| 2005/0185711 A1 | 8/2005 | Pfister et al. |
| 2005/0218297 A1 | 10/2005 | Suda et al. |
| 2006/0023074 A1 | 2/2006 | Cutler |
| 2006/0023106 A1 * | 2/2006 | Yee ..................... G02B 27/2228 348/335 |
| 2006/0023278 A1 | 2/2006 | Nishioka |
| 2006/0061660 A1 | 3/2006 | Brackmann |
| 2006/0098267 A1 | 5/2006 | Togawa |

(56) References Cited

U.S. PATENT DOCUMENTS

| | | |
|---|---|---|
| 2006/0140446 A1 | 6/2006 | Luo et al. |
| 2006/0193509 A1 | 8/2006 | Criminisi et al. |
| 2006/0215054 A1 | 9/2006 | Liang et al. |
| 2006/0215903 A1 | 9/2006 | Nishiyama |
| 2006/0238441 A1 | 10/2006 | Benjamin et al. |
| 2007/0024739 A1 | 2/2007 | Konno |
| 2007/0058961 A1 | 3/2007 | Kobayashi et al. |
| 2007/0064142 A1 | 3/2007 | Misawa et al. |
| 2007/0085903 A1 | 4/2007 | Zhang |
| 2007/0146530 A1 | 6/2007 | Nose |
| 2007/0164202 A1 | 7/2007 | Wurz et al. |
| 2007/0216796 A1 | 9/2007 | Lenel et al. |
| 2007/0242152 A1 | 10/2007 | Chen |
| 2007/0263115 A1 | 11/2007 | Horidan et al. |
| 2007/0268983 A1 | 11/2007 | Elam |
| 2008/0029708 A1 | 2/2008 | Olsen et al. |
| 2008/0030597 A1 | 2/2008 | Olsen et al. |
| 2008/0058629 A1* | 3/2008 | Seibel ............... A61B 1/0008 600/368 |
| 2008/0088702 A1 | 4/2008 | Linsenmaier et al. |
| 2008/0117289 A1 | 5/2008 | Schowengerdt et al. |
| 2008/0117532 A1 | 5/2008 | Shafer |
| 2008/0218612 A1 | 9/2008 | Border et al. |
| 2008/0259172 A1 | 10/2008 | Tamaru |
| 2008/0266404 A1 | 10/2008 | Sato |
| 2008/0290435 A1 | 11/2008 | Oliver et al. |
| 2008/0291543 A1 | 11/2008 | Nomura et al. |
| 2008/0297612 A1 | 12/2008 | Yoshikawa |
| 2008/0316301 A1 | 12/2008 | Givon |
| 2009/0003646 A1 | 1/2009 | Au et al. |
| 2009/0005112 A1 | 1/2009 | Sorek et al. |
| 2009/0015812 A1 | 1/2009 | Schultz et al. |
| 2009/0051804 A1 | 2/2009 | Nomura et al. |
| 2009/0080695 A1 | 3/2009 | Yang |
| 2009/0085846 A1 | 4/2009 | Cho et al. |
| 2009/0096994 A1 | 4/2009 | Smits |
| 2009/0153726 A1 | 6/2009 | Lim |
| 2009/0160931 A1 | 6/2009 | Pockett et al. |
| 2009/0268983 A1 | 10/2009 | Stone et al. |
| 2009/0268985 A1 | 10/2009 | Wong et al. |
| 2009/0296984 A1 | 12/2009 | Nijim et al. |
| 2009/0315808 A1 | 12/2009 | Ishii |
| 2010/0044555 A1 | 2/2010 | Ohara et al. |
| 2010/0045774 A1 | 2/2010 | Len et al. |
| 2010/0066812 A1 | 3/2010 | Kajihara et al. |
| 2010/0165155 A1 | 7/2010 | Chang |
| 2010/0202766 A1 | 8/2010 | Takizawa et al. |
| 2010/0215249 A1 | 8/2010 | Heitz et al. |
| 2010/0232681 A1 | 9/2010 | Fujieda et al. |
| 2010/0259655 A1 | 10/2010 | Takayama |
| 2010/0265313 A1 | 10/2010 | Liu et al. |
| 2010/0265363 A1 | 10/2010 | Kim |
| 2010/0278423 A1 | 11/2010 | Itoh et al. |
| 2010/0289878 A1 | 11/2010 | Sato et al. |
| 2010/0290703 A1 | 11/2010 | Sim et al. |
| 2010/0290769 A1 | 11/2010 | Nasiri et al. |
| 2010/0302396 A1 | 12/2010 | Golub et al. |
| 2010/0309286 A1 | 12/2010 | Chen et al. |
| 2010/0309333 A1 | 12/2010 | Smith et al. |
| 2011/0001789 A1 | 1/2011 | Wilson et al. |
| 2011/0007135 A1 | 1/2011 | Okada et al. |
| 2011/0009163 A1 | 1/2011 | Fletcher et al. |
| 2011/0012998 A1 | 1/2011 | Pan |
| 2011/0043623 A1 | 2/2011 | Fukuta et al. |
| 2011/0090575 A1 | 4/2011 | Mori |
| 2011/0096089 A1 | 4/2011 | Shenhav et al. |
| 2011/0096988 A1 | 4/2011 | Suen et al. |
| 2011/0128412 A1 | 6/2011 | Milnes et al. |
| 2011/0181588 A1 | 7/2011 | Barenbrug et al. |
| 2011/0213664 A1 | 9/2011 | Osterhout et al. |
| 2011/0235899 A1 | 9/2011 | Tanaka |
| 2011/0249341 A1 | 10/2011 | Difrancesco et al. |
| 2011/0262122 A1 | 10/2011 | Minamisawa et al. |
| 2011/0304764 A1 | 12/2011 | Shigemitsu et al. |
| 2012/0008148 A1 | 1/2012 | Pryce et al. |
| 2012/0033051 A1 | 2/2012 | Atanassov et al. |
| 2012/0044368 A1 | 2/2012 | Lin et al. |
| 2012/0056987 A1 | 3/2012 | Fedoroff |
| 2012/0075168 A1 | 3/2012 | Osterhout et al. |
| 2012/0229688 A1 | 9/2012 | Tajiri |
| 2012/0249750 A1 | 10/2012 | Izzat et al. |
| 2012/0249815 A1 | 10/2012 | Bohn et al. |
| 2012/0269400 A1 | 10/2012 | Heyward |
| 2012/0281072 A1 | 11/2012 | Georgiev et al. |
| 2012/0293607 A1 | 11/2012 | Bhogal et al. |
| 2012/0293632 A1 | 11/2012 | Yukich |
| 2012/0327195 A1 | 12/2012 | Cheng |
| 2013/0003140 A1 | 1/2013 | Keniston et al. |
| 2013/0010084 A1 | 1/2013 | Hatano |
| 2013/0038689 A1 | 2/2013 | Mcdowall |
| 2013/0070055 A1 | 3/2013 | Atanassov et al. |
| 2013/0076924 A1 | 3/2013 | Wade et al. |
| 2013/0077945 A1 | 3/2013 | Liu et al. |
| 2013/0128030 A1 | 5/2013 | Georgiev |
| 2013/0141802 A1 | 6/2013 | Yang |
| 2013/0182325 A1 | 7/2013 | Minamisawa et al. |
| 2013/0222556 A1 | 8/2013 | Shimada |
| 2013/0229529 A1 | 9/2013 | Lablans |
| 2013/0250045 A1 | 9/2013 | Ki et al. |
| 2013/0250053 A1 | 9/2013 | Levy |
| 2013/0250123 A1 | 9/2013 | Zhang et al. |
| 2013/0260823 A1 | 10/2013 | Shukla et al. |
| 2013/0278785 A1 | 10/2013 | Nomura et al. |
| 2013/0286451 A1 | 10/2013 | Verhaegh |
| 2013/0335598 A1 | 12/2013 | Gustavsson et al. |
| 2013/0335600 A1 | 12/2013 | Gustavsson et al. |
| 2014/0009631 A1 | 1/2014 | Topliss |
| 2014/0016832 A1 | 1/2014 | Kong et al. |
| 2014/0085502 A1 | 3/2014 | Lin et al. |
| 2014/0104378 A1 | 4/2014 | Kauff et al. |
| 2014/0111650 A1 | 4/2014 | Georgiev et al. |
| 2014/0139623 A1 | 5/2014 | Mccain et al. |
| 2014/0152852 A1 | 6/2014 | Ito et al. |
| 2014/0184749 A1 | 7/2014 | Hilliges et al. |
| 2014/0192253 A1 | 7/2014 | Laroia |
| 2014/0285673 A1 | 9/2014 | Hundley et al. |
| 2015/0043076 A1 | 2/2015 | Nakayama |
| 2015/0049172 A1 | 2/2015 | Ramachandra et al. |
| 2015/0070562 A1 | 3/2015 | Nayar et al. |
| 2015/0085363 A1 | 3/2015 | Liu et al. |
| 2015/0125092 A1 | 5/2015 | Zhuo et al. |
| 2015/0177524 A1 | 6/2015 | Webster et al. |
| 2015/0201128 A1 | 7/2015 | Dong |
| 2015/0244934 A1 | 8/2015 | Duparre et al. |
| 2015/0253647 A1 | 9/2015 | Mercado |
| 2015/0286033 A1 | 10/2015 | Osborne |
| 2015/0288865 A1 | 10/2015 | Osborne |
| 2015/0371387 A1 | 12/2015 | Atanassov et al. |
| 2015/0373268 A1 | 12/2015 | Osborne |
| 2015/0373269 A1 | 12/2015 | Osborne |
| 2016/0014332 A1* | 1/2016 | de Leon ............ G06K 9/00248 348/78 |
| 2016/0085059 A1 | 3/2016 | Mercado |
| 2016/0127641 A1* | 5/2016 | Gove ................... G06T 1/0007 348/143 |
| 2016/0127646 A1 | 5/2016 | Osborne |
| 2016/0198087 A1 | 7/2016 | Georgiev et al. |
| 2016/0269602 A1 | 9/2016 | Osborne |
| 2016/0286121 A1 | 9/2016 | Georgiev et al. |
| 2016/0295112 A1 | 10/2016 | Georgiev et al. |
| 2016/0353008 A1 | 12/2016 | Osborne |
| 2017/0026570 A1* | 1/2017 | Shepard ................ G03B 37/00 |
| 2017/0038502 A1 | 2/2017 | Georgiev |
| 2017/0118421 A1 | 4/2017 | Georgiev |

FOREIGN PATENT DOCUMENTS

| | | |
|---|---|---|
| CN | 101581828 A | 11/2009 |
| CN | 101867720 A | 10/2010 |
| CN | 101902657 A | 12/2010 |
| CN | 202405984 U | 8/2012 |
| EP | 0610605 A1 | 8/1994 |
| EP | 0751416 A1 | 1/1997 |
| EP | 1176812 A1 | 1/2002 |

(56) References Cited

FOREIGN PATENT DOCUMENTS

| | | |
|---|---|---|
| EP | 1383342 A2 | 1/2004 |
| EP | 1816514 A1 | 8/2007 |
| EP | 1832912 A2 | 9/2007 |
| EP | 2242252 A2 | 10/2010 |
| GB | 2354390 A | 3/2001 |
| GB | 2354391 A | 3/2001 |
| JP | H06251127 A | 9/1994 |
| JP | H089424 A | 1/1996 |
| JP | H0847001 A | 2/1996 |
| JP | H08125835 A | 5/1996 |
| JP | 08194274 A | 7/1996 |
| JP | H08242453 A | 9/1996 |
| JP | H10142490 A | 5/1998 |
| JP | 2001194114 A | 7/2001 |
| JP | 2003304561 A | 10/2003 |
| JP | 3791847 B1 | 6/2006 |
| JP | 2006279538 A | 10/2006 |
| JP | 2007147457 A | 6/2007 |
| JP | 2007323615 A | 12/2007 |
| JP | 2008009424 A | 1/2008 |
| JP | 2009122842 A | 6/2009 |
| JP | 2010041381 A | 2/2010 |
| JP | 2010067014 A | 3/2010 |
| JP | 2010128820 A | 6/2010 |
| JP | 2010524279 A | 7/2010 |
| KR | 20080071400 A | 8/2008 |
| WO | WO-9321560 A1 | 10/1993 |
| WO | WO-9847291 A2 | 10/1998 |
| WO | WO-2006075528 A1 | 7/2006 |
| WO | WO-2007129147 A1 | 11/2007 |
| WO | WO-2008112054 A1 | 9/2008 |
| WO | WO-2009047681 A1 | 4/2009 |
| WO | WO-2009086330 A2 | 7/2009 |
| WO | WO-2010019757 A1 | 2/2010 |
| WO | WO-2012136388 A1 | 10/2012 |
| WO | WO-2012164339 A1 | 12/2012 |
| WO | WO-2013154433 A1 | 10/2013 |
| WO | WO-2014012603 A1 | 1/2014 |
| WO | WO-2014025588 A1 | 2/2014 |

OTHER PUBLICATIONS

Hoff, et al., "Surfaces from Stereo: Integrating Feature Matching, Disparity Estimation, and Contour Detection", IEEE Transactions on Pattern Analysis and Machine Intelligence, vol. 11, No. 2, pp. 121-136, Feb. 1989.

Krotkov E., et al., "Active vision for reliable ranging: Cooperating focus, stereo, and vergence", International Journal of Computer Vision. vol. 11, No. 2, Oct. 1, 1993 (Oct. 1, 1993), pp. 187-203, XP055149875, ISSN: 0920-5691. DOI: 10.1007/BF01469228.

Murphy M., et al., "Lens Drivers Focus on Performance in High-Resolution Camera Modules," Analog Dialogue, Nov. 2006, vol. 40, pp. 1-3.

Narkhede, et al., "Stereoscopic Imaging: A Real-Time, In Depth Look," IEEE Potentials, Feb./Mar. 2004, vol. 23, Issue 1, pp. 38-42.

RICOH Imagine Change: "New RICOH THETA Model, Capturing 360-degree Images in One Shot, is on Sale Soon—Spherical Video Function, API and SDK (Beta Version)", News Release, 2014, 3 pages.

Sun W.S., et al., "Single-Lens Camera Based on a Pyramid Prism Array to Capture Four Images," Optical Review, 2013, vol. 20 (2), pp. 145-152.

Han Y., et al., "Removing Illumination from Image Pair for Stereo Matching", Audio, Language and Image Processing (ICALIP), 2012 International Conference on, IEEE, Jul. 16, 2012, XP032278010, pp. 508-512.

International Search Report and Written Opinion—PCT/US2015/035978—ISA/EPO—Sep. 28, 2015.

Shuchun Y., et al., "Preprocessing for stereo vision based on LOG filter", Proceedings of 2011 6th International Forum on Strategic Technology, Aug. 2011, XP055211077, pp. 1074-1077.

Hao M., et al., "Object Location Technique for Binocular Stereo Vision Based on Scale Invariant Feature Transform Feature Points", SIFT, Journal of Harbin Engineering University, Jun. 2009, vol. 30, No. 6 pp. 649-653.

Hua et al., "Design Analysis of a High-Resolution Panoramic Camera Using Conventional Imagers and a Mirror Pyramid," IEEE Transactions on Pattern Analysis and Machine Intelligence; Feb. 2007; 29(2): 356-361.

Kawanishi T., et al., "Generation of High-Resolution Stereo Panoramic Images by Omnidirectional Imaging Sensor Using Hexagonal Pyramidal Mirrors", Patiern Recognition, 1998, Proceedings, Fourteenth International Conference on Brisbane, QLD., Australia Aug. 16-20, 1998, Los Alamitos, CA, USA,IEEE Comput. Soc, US, Jan. 1, 1998 (Jan. 1, 1998), pp. 485-489, vol. 1, XP031098377.

Meng et al., "Single-shot Specular Surface Reconstruction with Gonio-plenoptic Imaging," 2015 IEEE International Conference on Computer Vision; pp. 3433-3441.

Tan K-H., et al., "Multiview Panoramic Cameras Using a Pyramid", Omnidirectional Vision, 2002, Proceedings, Third Workshop on Jun. 2, 2002, Piscataway, NJ, USA,IEEE, Jan. 1, 2002 (Jan. 1, 2002), pp. 87-93, XP010611080.

Chowdhury A., et al., "Challenges of Megapixel Camera Module Assembly and Test," Electronic Components and Technology Conference, 2005, pp. 1390-1401.

\* cited by examiner

WIDE FIELD OF VIEW ARRAY CAMERA FOR HEMISPHERIC AND SPHERICAL IMAGING

CROSS REFERENCE TO RELATED APPLICATIONS

The present application claims the benefit under 35 U.S.C. §119(e) of U.S. Provisional Patent Application No. 62/015,329, filed on Jun. 20, 2014, entitled "ULTRA WIDE FIELD OF VIEW ARRAY CAMERA—CAPABLE OF CAPTURING HEMISPHERE, FULL SPHERICAL IMAGES AND OTHER RELATED CONFIGURATIONS," the contents of which is hereby incorporated by reference herein.

TECHNICAL FIELD

The present disclosure relates to imaging systems and methods that include a multi-camera array. In particular, the disclosure relates to systems and methods that enable low-profile imaging systems and mobile devices while capturing wide field of view images.

BACKGROUND

Many mobile devices, such as mobile phones and tablet computing devices, include cameras that may be operated by a user to capture still and/or video images. Because the mobile devices are typically designed to be relatively small, it can be important to design the cameras or imaging systems to be as thin as possible in order to maintain a low-profile mobile device. Folded optic image sensor arrays ("array cameras") allow for the creation of low-profile image capture devices without shortening the focal length or decreasing the resolution of the image across the sensor array's field of view. By redirecting light toward each sensor in the array using a primary and secondary surface, and by positioning the lens assemblies used to focus the incoming light between the primary and secondary surfaces, the sensor array may be positioned on a flat substrate perpendicular to the lens assemblies. The longer focal length makes it possible to implement features such as optical zoom and to incorporate more complicated optics that require more space than commonly afforded by the traditional mobile camera, such as adding more optical elements.

Cameras may require expensive and large optical components to produce a wide field of view ("FOV") for capturing an image. Some cameras (for example, on mobile devices) may have size and/or weight limitations on the lenses that can be used to produce wide or ultra-wide FOV's, such that the use of large optical components needed to capture a wide FOV are impractical. Accordingly, being able to produce a wide, ultra-wide or hemispherical image using a small imaging apparatus, for example as implemented in a mobile device, may be desirable for many users.

SUMMARY

The folded optic sensor arrays and image capture techniques described herein allow for the creation of low-profile image capture devices without shortening the focal length or decreasing the resolution of the image across the sensor array's field of view, wherein the captured images have a wide field of view and are free of parallax and tilt artifacts. A challenge of thin form factor array cameras is capturing images having a wide field of view without increasing the height of the overall array. Another challenge of existing array cameras is the quality degradation due to parallax and tilt between different views of same object as seen from different cameras of the array. Parallax prevents seamless stitching of the images captured by each camera into a final image completely free of artifacts. Camera views can partially overlap (for example by approximately 20%). Depending on depth (e.g., distance from lens to object) the image from one camera can be shifted relative to the image from another camera. The resulting parallax and tilt can cause "double image" ghosting in the image area corresponding to the overlapping fields of view when the images are stitched or fused together. Even if the array is structured such that there is no overlap in sensor fields of view, parallax results in discontinuous features in the image, such as lines and edges, when such features cross over the borders between sensor fields of view.

The above-described problems, among others, are addressed in some embodiments by the wide field of view array cameras free of parallax and tilt artifacts as described herein. Some of the embodiments may employ a center camera to capture a center field of view. As used herein, "camera" may refer to an image sensor (or dedicated portion of multi-area sensor substrate) and any corresponding optical components that affect light provided to the image sensor. For example, optical components may include, but are not limited to, one or more of an aperture, lens, lens assembly which may include multiple lenses and/or other light focusing or collimating components, mirrors, refractive elements, and/or reflective elements, and any optional optical folding elements (e.g., reflective surfaces or refractive prisms). The center camera can be surrounded by a number of additional periphery cameras. A central structure of mirrors, for example a fixed structure with multiple surfaces or facets or a number of extendible reflectors, can be positioned to allow light representing a center portion of the target image to pass through to the center camera and to split incoming light representing a circumferential portion of the target image (for example a 180 degree panorama surrounding the center portion) into multiple portions for capture by the additional cameras in the array. The additional periphery cameras may include one or more optical folding elements to redirect light received from a corresponding reflector toward the sensor of the camera, or toward a dedicated portion of a multi-area sensor substrate. Accordingly, in some embodiments the sensors of each camera in the array can be positioned on a substantially flat substrate or can be formed as a single substrate with multiple image sensing areas. Such configurations can serve to reduce the height of the array compared to having sensors positioned in different planes. Such a configuration may also reduce the cost of manufacturing and/or positioning multiple sensors. The mirror surfaces and cameras can be positioned according to predetermined spatial relationships to avoid causing parallax and tilt artifacts in a captured image.

Each portion of the split light representing the target image scene may undergo any required processing, for example projective transform, and be assembled into the target image, for example by linear blending or other image stitching techniques. By using the center camera, reflective structure, and periphery cameras, some examples of the wide field of view array can achieve a hemispherical field of view wherein the center camera captures a central portion of the hemispherical field of view and the surrounding cameras cooperate to capture a circumferential portion of the hemispherical field of view that, when stitched with the central portion, forms the entire hemispherical field of view. Such a hemispherical camera can maintain a relatively thin form factor, for example approximately 9 mm in height with approximately 5 mm in height for the array of cameras and approximately 4 mm in height for the reflectors, while capturing a wide field of view without parallax between the individual images used to form the entire field of view. Some embodiments may have smaller height for either or both of the array of cameras and the height of the reflectors. By combining two such cameras, for example in a back to back configuration, some examples can achieve a full spherical field of view while maintaining a relatively thin form factor, for example approximately 18 mm in height. In some embodiments, the reflectors can be retractable to lie flat against the housing containing the array such that, when not in use, the hemispherical camera has a thin form factor of approximately 5-6 mm and the spherical camera has a thin form factor of approximately 10-12 mm. With careful selection of materials, other embodiments may be even smaller (for example, have less height and a thinner form factor). Of course, some embodiments may also be larger for applications where a thin form factor is not necessary for the implementation.

One embodiment of an image capture system for capturing wide field-of-view images, includes an aperture, a central camera positioned to receive light through the aperture, the center camera having an optical axis. In some embodiments the optical axis of the central camera goes through the center of an entrance pupil of the image capture system and is vertical to the sensor plane. In some embodiments the aperture is the entrance pupil. In some embodiments a plurality of periphery cameras are disposed beside the central camera and pointed towards a portion of the optical axis of the center camera. The plurality of periphery cameras may be arranged around the center camera. For example, in some embodiments six (6) periphery cameras (or more or less, as required by the specific design and sensor area) can be spaced equally around and equidistant from the center camera in a substantially circular configuration. The spacing and distance of the periphery cameras can be varied depending on the specific design requirements of the array.

In some embodiments, a plurality of extendible reflectors maybe configured to move from a first (or retracted) position that is substantially parallel to a plane that the aperture is disposed in (for example, an upper surface of a camera housing containing the center camera and periphery cameras) to a second (or extended) position that is closer to the optical axis of the center camera. The reflectors may include a mirrored (or otherwise generally light reflecting) first surface that faces away from the optical axis of the center camera and a black (or otherwise generally light absorbing) second surface that faces towards the optical axis of the center camera. The plurality of periphery cameras and the plurality of mirrors may be arranged relative to each other such that that at least a portion of the light reflected from a mirrored first surface enters one of the plurality of periphery cameras when the plurality of extendible reflectors are in the second position.

In one specific implementation of the wide field of view array camera, for example when the camera is used in a mobile device having a desired thin form factor (for example a cell phone, tablet computing device, or other portable computing device), the mirrors around the central camera may be retracted so the center camera is the only camera in use. In this position the central camera can have a wider field of view than that when the mirrors are extended. When the mirrors are extended to their second position, for example at height "G" as shown in FIG. 5A, the central camera can have a narrower field of view than when the mirrors are retracted, but the surrounding periphery cameras can, in this configuration, receive light to extend the overall field of view of the array camera compared to the field of view of the central camera with the reflectors retracted, for example to achieve a full hemispherical field of view.

The height G (FIG. 5A) of the extended mirrors, (measured parallel to the central camera optical axis between the entrance pupil of the central camera and the height G of the surrounding mirrors,) can be a given value provided by a camera designer or can be one automatically generated by optimization design software. Such software could be set-up to optimize a set of desired outcomes, such as finding the shortest height necessary where factors such as manufacturing tolerances are taken into account or physical mechanical design constraints. The tilt of the mirror (that is, the angle formed between the mirror 561 and a plane parallel to the central camera optical axis) is illustrated by "β" in FIG. 5A, which could be a given value, for example, as determined by optimization design software. The angle of β can be 0 to +/−360° In some embodiments, the system is configured to produce a hemispherical image when the extendible reflectors are positioned in the second position. In some embodiments, the system is configured to produce a spherical image when the extendible reflectors are positioned in the second position.

One objective of the wide field of view array camera is to design a high resolution hemisphere camera for the thin mobile phone. Typical mobile phones use cameras that have a diagonal field of view (DFOV) between 64 degrees to 76 degrees, which is approximately equivalent to pictures captured by a "full frame" DSLR camera with a 35 mm or a 28 mm focal length lens, respectively. Largely because of the wide use of mobile phone cameras, images captured with lenses that are equivalent in field of view to a 35 mm full frame DSLR lens are now considered by many people to produce the most natural looking pictures. Therefore it can be desirable for some implementations of the wide field of view array camera to be able to capture pictures with a typical DFOV, as well as wider DFOV pictures and hemisphere pictures.

One way to view hemispherical images captured by the wide field of view array cameras described herein is to use virtual reality goggles. Alternatively, the images can be processed to produce flat images showing the content captured in the hemisphere image, for example for display on a flat panel display such as typically is provided for mobile and desktop computing devices. Such a flat image may take the form of a half-circle for a hemispheric image and a full circle for a spherical image in some examples.

Capturing pictures with a DFOV much wider than 76 degrees can be difficult to implement using one camera in a mobile phone for several reasons. As the field of view increases the relative illumination roll-off increases. Normally, for mobile phones, wide field of view lenses have significant drop in modulation transfer function (MTF) performance at the edge of the field of view compared to the center of the field of view. Manufacturing tolerances for optical components are tighter for mobile device cameras than for larger cameras because lens decentering and tilting will further reduce the MTF near the edges of the field of view. Using an array of cameras as described herein can be a good solution to overcome the difficulties of using only a single camera having a DFOV of, for example, about 76 degrees or wider. Each camera in the array will see part of the total image; hence each camera will have a narrower field of view than a single wide field of view camera will have. This can result in each of the array cameras having less relative illumination lens roll-off at the outer edges of each lens, thereby resulting in a more uniform illumination across the combined image. Similarly the MTF at the edges of a combined image having a wide field of view may be higher than that of a single lens used to capture a similar field of view.

One aspect relates to an image capture system for capturing wide field-of-view images, comprising a first imaging system, comprising a first aperture; a first center camera positioned to receive light through the first aperture, the first center camera having an optical axis that extends through the aperture; a first plurality of periphery cameras arranged around the first center camera and pointed towards a portion of the optical axis of the first center camera; and a first plurality of extendible reflectors configured to move from a first position to a second position, the first imaging system having a first FOV with the first plurality of extendible reflectors in the first position and having a second FOV with the first plurality of extendible reflectors in the second position, the second FOV being larger than the first FOV, the second position being closer to the optical axis of the first center camera, the first plurality of periphery cameras and the first plurality of extendible reflectors arranged relative to each other such that that at least a portion of light reflected from one of the first plurality of extendible reflectors enters a corresponding one of the first plurality of periphery cameras when the first plurality of extendible reflectors are in the second position.

Some embodiments of the image capture system further comprise a second imaging system, comprising a second aperture; a second central camera positioned to receive light through the second aperture, the second center camera having an optical axis that extends through the second aperture; a second plurality of periphery cameras arranged around the second center camera and pointed towards a portion of the optical axis of the second center camera; and a second plurality of extendible reflectors configured to move from a third position to a fourth position, the second imaging system having the first FOV with the second plurality of extendible reflectors in the third position and having the second FOV with the second plurality of extendible reflectors in the second position, the fourth position being closer to the optical axis of the second center camera than the third position, the second plurality of periphery cameras and the second plurality of extendible reflectors arranged relative to each other such that that at least a portion of light reflected from one of the second plurality of additional extendible reflectors enters a corresponding one of the second plurality of periphery cameras when the second plurality of extendible reflectors are in the fourth position.

Another aspect relates to a method for capturing using a single array camera a wide field-of-view image, comprising controlling the positioning of a plurality of extendible reflectors positioned around a center camera, a plurality of periphery cameras also positioned around the center camera and each associated with one of the plurality of extendible reflectors, the center camera having an optical axis and the plurality of periphery cameras pointed toward a portion of the optical axis; determining whether to capture the standard field-of-view image or the wide field-of-view image, the wide field-of-view image covering a greater field than the standard field-of-view image; in response to determining to capture the standard field-of-view image positioning the plurality of extendible reflectors in a first position, and capturing the standard field-of-view image using the center camera; and in response to determining to capture the wide field-of-view image positioning the plurality of extendible reflectors in a second position such that at least a portion of light reflected from one of the plurality of extendible reflectors enters an associated one of the plurality of periphery cameras, capturing a central portion of the wide field-of-view image using the center camera, and capturing a plurality of periphery portions of the wide field-of-view image using the plurality of periphery cameras.

Another aspect relates to non-transitory computer-readable medium storing instructions that, when executed, cause one or more processors to perform operations comprising, for controlling the positioning of a plurality of extendible reflectors positioned around a center camera and each associated with one of a plurality of periphery cameras also positioned around the center camera determining whether to capture the standard field-of-view image or the wide field-of-view image, the wide field-of-view image covering a greater field than the standard field-of-view image; in response to determining to capture the standard field-of-view image generating first instructions to position the plurality of extendible reflectors in a first position, and receiving first image data comprising the standard field-of-view image from the center camera; and in response to determining to capture the wide field-of-view image generating second instructions to position the plurality of extendible reflectors in a second position such that at least a portion of light reflected from one of the plurality of extendible reflectors enters an associated one of the plurality of periphery cameras, and receiving second image data comprising a central portion of the wide field-of-view image from the center camera and a plurality of periphery portions of the wide field-of-view image from the plurality of periphery cameras.

Another aspect relates to an apparatus for capturing a standard field-of-view image or a wide field-of-view image, the apparatus comprising housing means having at least an upper surface and a lower surface spaced apart from the upper surface; image sensing means positioned between the upper surface and the lower surface; light focusing means positioned below a first aperture in the upper surface of the housing means and above a central sensing area of the image sensing means; a plurality of additional light focusing means positioned around the first light focusing means and below a corresponding plurality of additional apertures in the upper surface of the housing means and above a plurality of additional sensing areas of the image sensing means; and a plurality of light reflecting means positioned around the first aperture above the first lens assembly, each of the plurality of light reflecting means associated with one of the plurality of additional light focusing means.

BRIEF DESCRIPTION OF THE DRAWINGS

Certain aspects will hereinafter be described in conjunction with the appended drawings, which are provided to illustrate and not to limit the disclosed aspects, wherein like designations denote like elements.

DETAILED DESCRIPTION

I. Introduction

Implementations disclosed herein include embodiments for systems, methods and apparatus for generating images substantially free of parallax and tilt artifacts using an array camera with folded optics. Other embodiments are also possible, for example, embodiments that include one or more aspects of the features described herein; accordingly this description and the figures should not be interpreted as limiting the described invention to particular embodiments. Aspects of the present invention relate to an array camera exhibiting little or no parallax artifacts in the captured images. For example, the planes of the central mirror prism of the array camera can intersect at a common point (referred to as an "apex") defining the vertical axis of symmetry of the system. The apex can serve as a point of intersection for the optical axes of the sensors in the array. Each sensor in the array "sees" a portion of the image scene using a corresponding facet of the central mirror prism, and accordingly each individual sensor/mirror pair represents only a sub-aperture of the total array camera. The complete array camera has a synthetic aperture generated based on the sum of all individual aperture rays, that is, based on stitching together the images generated by the sub-apertures. In any of the implementations, all the cameras may be configured to automatically focus, and the automatic focus may be controlled by a processor executing instructions for automatic focus functionality. Although throughout this disclosure a center camera or a side camera may be referred to and described as an array camera, or described in reference to folded-optics, unless otherwise stated such cameras may also be non-array (folded optic) cameras that are designed to fit in the space allocated for embodiments described herein and related to the examples herein.

In the following description, specific details are given to provide a thorough understanding of the examples. However, the examples may be practiced without these specific details.

II. Overview of Folded Optic Array Cameras

Figure 1A:
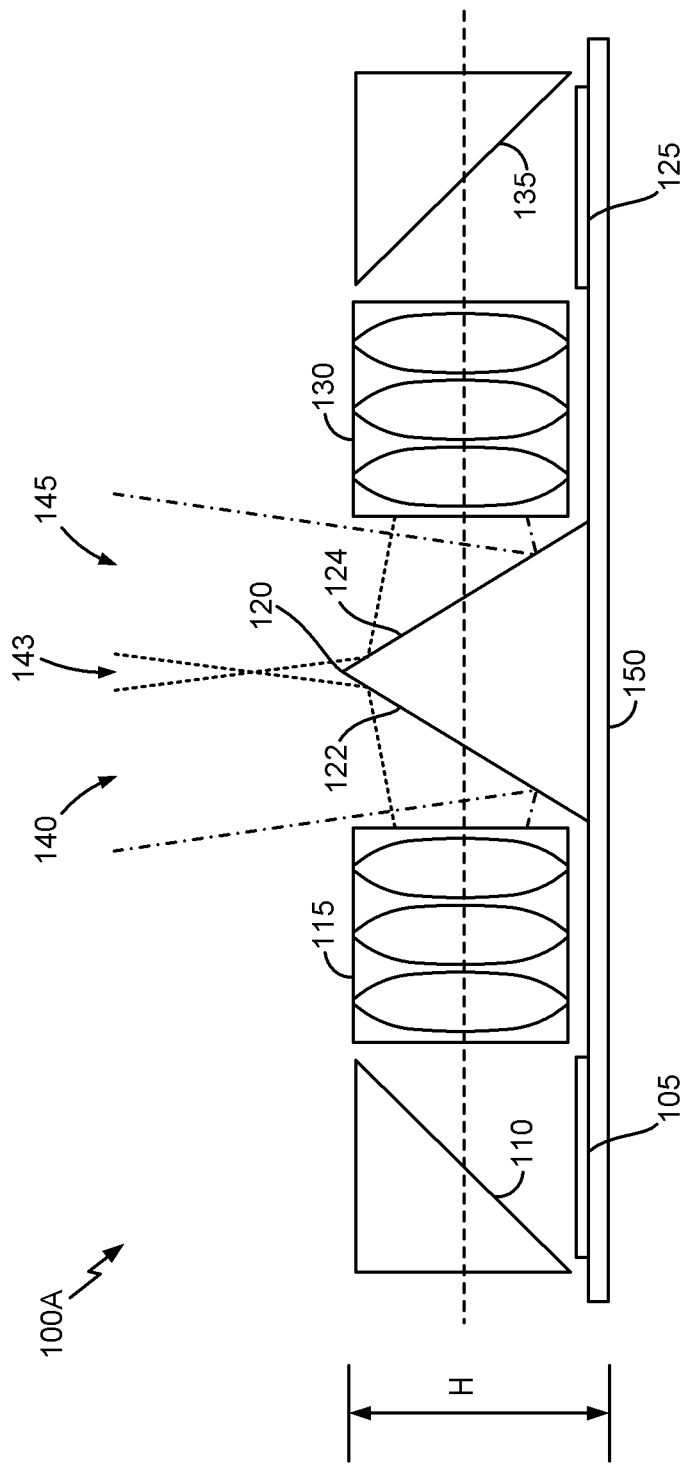
FIG. 1A illustrates a cross-sectional side view of an embodiment of a folded optic sensor assembly.
Figure 1B:
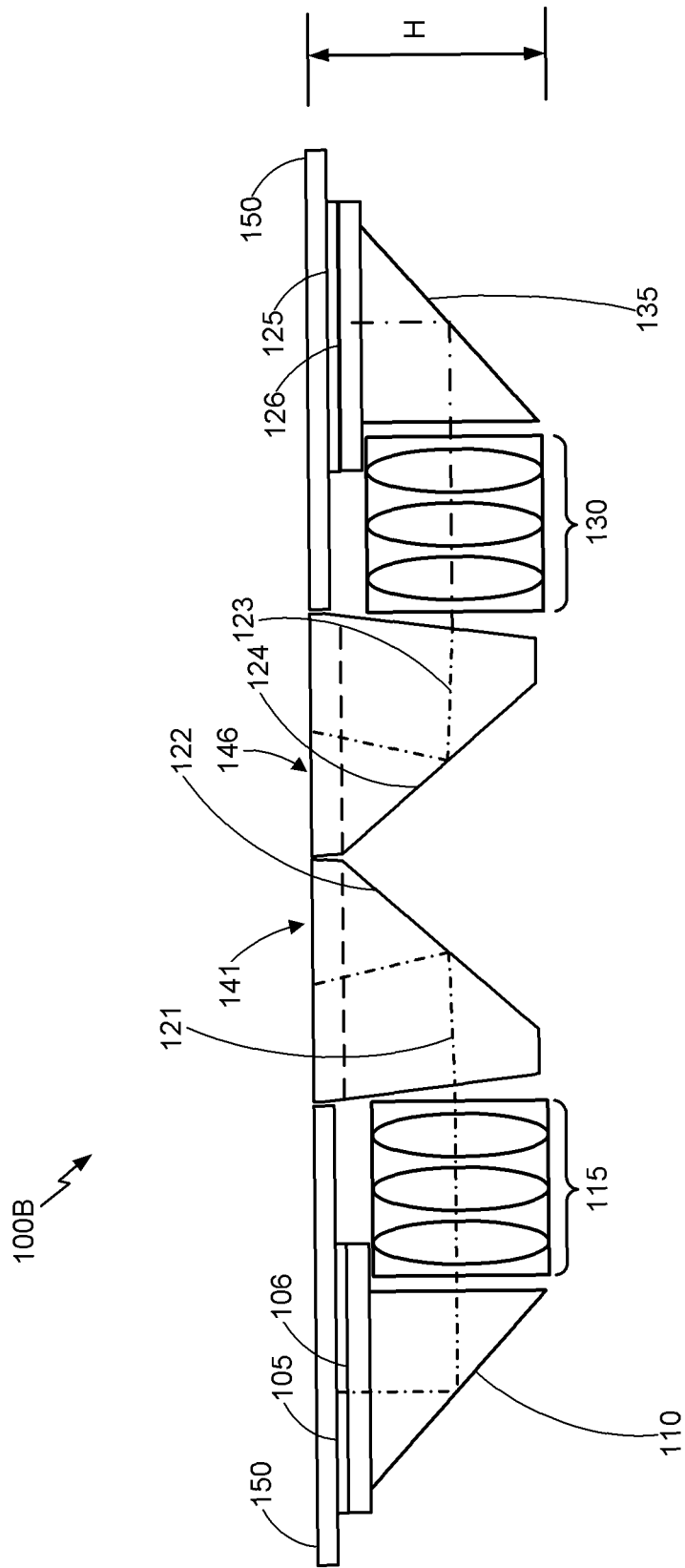
FIG. 1B illustrates a cross-sectional side view of another embodiment of a folded optic sensor assembly.

Referring now to FIGS. 1A and 1B, examples of a folded optic multi-sensor assembly 100A, 100B suitable for use with the autofocus systems and techniques described herein will now be described in greater detail. FIG. 1A illustrates a cross-sectional side view of an example of a folded optics array 100A including image sensors 105, 125, reflective secondary light folding surfaces 110, 135, lens assemblies 115, 130, and a central reflective surface 120 which may all be mounted to a substrate 150. FIG. 1B illustrates a cross-sectional side view of an embodiment of a folded optic sensor array including central prisms 141, 146 for primary light folding surfaces 122, 124 and additional prisms forming secondary light folding surfaces 135, 110.

Referring to FIG. 1A, the image sensors 105, 125 may include, in certain embodiments, a charge-coupled device (CCD), complementary metal oxide semiconductor sensor (CMOS), or any other image sensing device that receives light and generates image data in response to the received image. Each sensor 105, 125 may include a plurality of sensors (or sensor elements) arranged in an array. Image sensors 105, 125 may be able to obtain image data of still photographs and may also provide information regarding motion in a captured video stream. Sensors 105 and 125 may be an individual sensor array, or each may represent arrays of sensors arrays, for example, a 3×1 array of sensor arrays. However, as will be understood by one skilled in the art, any suitable array of sensors may be used in the disclosed implementations.

The sensors 105, 125 may be mounted on the substrate 150 as shown in FIG. 1A. In some embodiments, all sensors may be on one plane by being mounted to the flat substrate 150. Substrate 150 may be any suitable substantially flat material. The central reflective surface 120 and lens assemblies 115, 130 may be mounted on the substrate 150 as well. Multiple configurations are possible for mounting a sensor array or arrays, a plurality of lens assemblies, and a plurality of primary and secondary reflective or refractive surfaces.

In some embodiments, a central reflective surface 120 may be used to redirect light from a target image scene toward the sensors 105, 125. Central reflective surface 120 may be a mirror or a plurality of mirrors, and may be flat or shaped as needed to properly redirect incoming light to the image sensors 105, 125. For example, in some embodiments, central reflective surface 120 may be a mirror sized and shaped to reflect incoming light rays through the lens assemblies 115, 130 to sensors 105, 125. The central reflective surface 120 may split light comprising the target image into multiple portions and direct each portion at a different sensor. For example, a first side 122 of the central reflective surface 120 (also referred to as a primary light folding surface, as other embodiments may implement a refractive prism rather than a reflective surface) may send a portion of the light corresponding to a first field of view 140 toward the left sensor 105 while a second side 124 sends a second portion of the light corresponding to a second field of view 145 toward the right sensor 125. It should be appreciated that together the fields of view 140, 145 of the image sensors cover at least the target image.

In some embodiments in which the receiving sensors are each an array of a plurality of sensors, the central reflective surface may be made of multiple reflective surfaces angled relative to one another in order to send a different portion of the target image scene toward each of the sensors. Each sensor in the array may have a substantially different field of view, and in some embodiments the fields of view may overlap. Certain embodiments of the central reflective surface may have complicated non-planar surfaces to increase the degrees of freedom when designing the lens system. Further, although the central surface is discussed as being a reflective surface, in other embodiments central surface may be refractive. For example, central surface may be a prism configured with a plurality of facets, where each facet directs a portion of the light comprising the scene toward one of the sensors.

After being reflected off the central reflective surface 120, at least a portion of incoming light may propagate through each of the lens assemblies 115, 130. One or more lens assemblies 115, 130 may be provided between the central reflective surface 120 and the sensors 105, 125 and reflective surfaces 110, 135. The lens assemblies 115, 130 may be used to focus the portion of the target image which is directed toward each sensor.

In some embodiments, each lens assembly may comprise one or more lenses and an actuator for moving the lens among a plurality of different lens positions through a housing. The actuator may be a voice coil motor (VCM), micro-electronic mechanical system (MEMS), or a shape memory alloy (SMA). The lens assembly may further comprise a lens driver for controlling the actuator.

In some embodiments, traditional auto focus techniques may be implemented by changing the focal length between the lens 115, 130 and corresponding sensor 105, 125 of each camera. In some embodiments, this may be accomplished by moving a lens barrel. Other embodiments may adjust the focus by moving the central mirror up or down or by adjusting the angle of the mirror relative to the lens assembly. Certain embodiments may adjust the focus by moving the side mirrors over each sensor. Such embodiments may allow the assembly to adjust the focus of each sensor individually. Further, it is possible for some embodiments to change the focus of the entire assembly at once, for example by placing a lens like a liquid lens over the entire assembly. In certain implementations, computational photography may be used to change the focal point of the camera array.

Multiple side reflective surfaces, for example, reflective surfaces 110 and 135, can be provided around the central mirror 120 opposite the sensors. After passing through the lens assemblies, the side reflective surfaces 110, 135 (also referred to as a secondary light folding surface, as other embodiments may implement a refractive prism rather than a reflective surface) can reflect the light (downward, as depicted in the orientation of FIG. 1A) onto the sensors 105, 125. As depicted, sensor 105 may be positioned beneath reflective surface 110 and sensor 125 may be positioned beneath reflective surface 135. However, in other embodiments, the sensors may be above the side reflected surfaces, and the side reflective surfaces may be configured to reflect light upward (see for example, FIG. 1B). Other suitable configurations of the side reflective surfaces and the sensors are possible in which the light from each lens assembly is redirected toward the sensors. Certain embodiments may enable movement of the side reflective surfaces 110, 135 to change the focus or field of view of the associated sensor.

Each sensor's field of view 140, 145 may be steered into the object space by the surface of the central mirror 120 associated with that sensor. Mechanical methods may be employed to tilt the mirrors and/or move the prisms in the array so that the field of view of each camera can be steered to different locations on the object field. This may be used, for example, to implement a high dynamic range camera, to increase the resolution of the camera system, or to implement a plenoptic camera system. Each sensor's (or each 3×1 array's) field of view may be projected into the object space, and each sensor may capture a partial image comprising a portion of the target scene according to that sensor's field of view. As illustrated in FIG. 1A, in some embodiments, the fields of view 140, 145 for the opposing sensor arrays 105, 125 may overlap by a certain amount 143. To reduce the overlap 143 and form a single image, a stitching process as described below may be used to combine the images from the two opposing sensor arrays 105, 125. Certain embodiments of the stitching process may employ the overlap 143 for identifying common features in stitching the partial images together. After stitching the overlapping images together, the stitched image may be cropped to a desired aspect ratio, for example 4:3 or 1:1, to form the final image. In some embodiments, the alignment of the optical elements relating to each FOV are arranged to minimize the overlap 143 so that the multiple images are formed into a single image with minimal or no image processing required in joining the images.

FIG. 1B illustrates a cross-sectional side view of another embodiment of a folded optic array camera 100B. As shown in FIG. 1B, a sensor assembly 100B includes a pair of image sensors 105, 125 each mounted to substrate 150, lens assemblies 115, 130 corresponding to image sensors 105, 125, respectively, and a secondary light folding surface 110, 135 positioned over the cover glass 106, 126 of image sensors 105, 125, respectively. The primary light folding surface 122 of refractive prism 141 directs a portion of light from the target image scene along optical axis 121 through the lens assembly 115, is redirected off of the secondary light folding surface 110, passes through the cover glass 106, and is incident upon the sensor 105. The primary light folding surface 124 of refractive prism 146 directs a portion of light from the target image scene along optical axis 123 through the lens assembly 130, is redirected off of the secondary light folding surface 135, passes through the cover glass 126, and is incident upon the sensor 125. The folded optic array camera 100B is illustrative of one array camera embodiment implementing refractive prisms instead of the reflective surfaces of the array camera 100A of FIG. 1A. Each of the refractive prisms 141, 146 is provided in an aperture in the substrate 150 such that the primary light directing surfaces 122, 124 are below the plane formed by substrate and receive light representing the target image scene.

The sensors 105, 125 may be mounted on the substrate 150 as shown in FIG. 1B. In some embodiments, all sensors may be on one plane by being mounted to the flat substrate 150. Substrate 150 may be any suitable substantially flat material. The substrate 150 can include an aperture as described above to allow incoming light to pass through the substrate 150 to the primary light folding surfaces 122, 124. Multiple configurations are possible for mounting a sensor array or arrays, as well as the other camera components illustrated, to the substrate 150.

Primary light folding surfaces 122, 124 may be prism surfaces as illustrated, or may be a mirror or a plurality of mirrors, and may be flat or shaped as needed to properly redirect incoming light to the image sensors 105, 125. In some embodiments the primary light folding surfaces 122, 124 may be formed as a central mirror pyramid or prism as illustrated in FIG. 1A. The central mirror pyramid, prism, or other reflective surface may split light representing the target image into multiple portions and direct each portion at a different sensor. For example, a primary light folding surface 122 may send a portion of the light corresponding to a first field of view toward the left sensor 105 while primary light folding surface 124 sends a second portion of the light corresponding to a second field of view toward the right sensor 125. In some embodiments in which the receiving sensors are each an array of a plurality of sensors, the light folding surfaces may be made of multiple reflective surfaces angled relative to one another in order to send a different portion of the target image scene toward each of the sensors. It should be appreciated that together the fields of view of the cameras cover at least the target image, and can be aligned and stitched together after capture to form a final image captured by the synthetic aperture of the array. Each sensor in the array may have a substantially different field of view, and in some embodiments the fields of view may overlap.

As illustrated by FIGS. 1A and 1B, each array camera has a total height H. In some embodiments, the total height H can be approximately 4.5 mm or less. In other embodiments, the total height H can be approximately 4.0 mm or less. Though not illustrated, the entire array camera 100A, 100B may be provided in a housing having a corresponding interior height of approximately 4.5 mm or less or approximately 4.0 mm or less.

As used herein, the term "camera" may refer to an image sensor, lens system, and a number of corresponding light folding surfaces, for example the primary light folding surface 124, lens assembly 130, secondary light folding surface 135, and sensor 125 as illustrated in FIGS. 1A and 1B. A folded-optic multi-sensor array, referred to as an "array" or "array camera," can include a plurality of such cameras in various configurations, for example as illustrated in the embodiments illustrated in FIGS. 1A and 1B. Some embodiments of array configurations are disclosed in U.S. Application Pub. No. 2014/0111650, filed Mar. 15, 2013 and titled "MULTI-CAMERA SYSTEM USING FOLDED OPTICS," the disclosure of which is hereby incorporated by reference. Other array camera configurations that would benefit from the autofocus systems and techniques described herein are possible.

Figure 2:
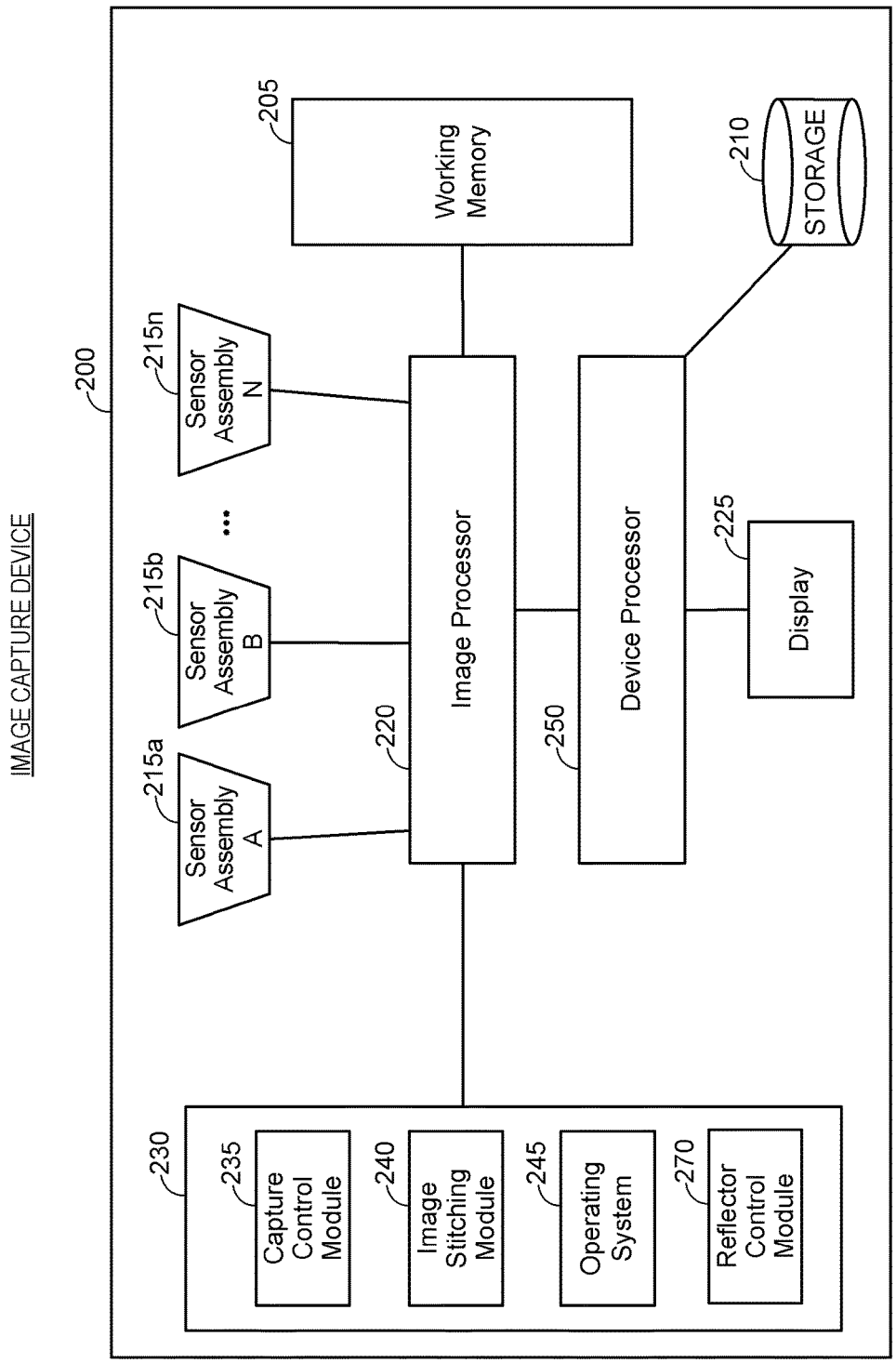
FIG. 2 illustrates a block diagram of one embodiment of an image capture device.

FIG. 2 depicts a high-level block diagram of a device 200 having a set of components including an image processor 220 linked to one or more cameras 215a-n. The image processor 220 is also in communication with a working memory 205, memory component 230, and device processor 250, which in turn is in communication with storage 210 and electronic display 225.

Device 200 may be a cell phone, digital camera, tablet computer, personal digital assistant, or the like. There are many portable computing devices in which a reduced thickness imaging system such as is described herein would provide advantages. Device 200 may also be a stationary computing device or any device in which a thin imaging system would be advantageous. A plurality of applications may be available to the user on device 200. These applications may include traditional photographic and video applications, high dynamic range imaging, panoramic photo and video, or stereoscopic imaging such as 3D images or 3D video.

The image capture device 200 includes the cameras 215a-n for capturing external images. The cameras 215a-n may each comprise a sensor, lens assembly, and a primary and secondary reflective or refractive surface for redirecting a portion of a target image to each sensor, as discussed above with respect to FIGS. 1A and 1B. In general, N cameras 215a-n may be used, where N≥2. Thus, the target image may be split into N portions in which each sensor of the N cameras captures one portion of the target image according to that sensor's field of view. It will be understood that cameras 215a-n may comprise any number of cameras suitable for an implementation of the folded optic imaging device described herein. The number of sensors may be increased to achieve lower z-heights of the system, or to meet the needs of other purposes, such as having overlapping fields of view similar to that of a plenoptic camera, which may enable the ability to adjust the focus of the image after post-processing. Other embodiments may have a field of view overlap configuration suitable for high dynamic range cameras enabling the ability to capture two simultaneous images and then merge them together. The cameras 215a-n may be coupled to the image processor 220 to communicate captured images to the working memory 205, the device processor 250, to the electronic display 225 and to the storage (memory) 210.

The image processor 220 may be configured to perform various processing operations on received image data comprising N portions of the target image in order to output a high quality stitched image, as will be described in more detail below. Image processor 220 may be a general purpose processing unit or a processor specially designed for imaging applications. Examples of image processing operations include cropping, scaling (e.g., to a different resolution), image stitching, image format conversion, color interpolation, color processing, image filtering (for example, spatial image filtering), lens artifact or defect correction, etc. Image processor 220 may, in some embodiments, comprise a plurality of processors. Certain embodiments may have a processor dedicated to each image sensor. Image processor 220 may be one or more dedicated image signal processors (ISPs) or a software implementation of a processor.

As shown, the image processor 220 is connected to a memory 230 and a working memory 205. In the illustrated embodiment, the memory 230 stores capture control module 235, image stitching module 240, operating system 245, and reflector control module 270. These modules include instructions that configure the image processor 220 of device processor 250 to perform various image processing and device management tasks. Working memory 205 may be used by image processor 220 to store a working set of processor instructions contained in the modules of memory component 230. Alternatively, working memory 205 may also be used by image processor 220 to store dynamic data created during the operation of device 200.

As mentioned above, the image processor 220 is configured by several modules stored in the memories. The capture control module 235 may include instructions that configure the image processor 220 to call reflector control module 270 to position the extendible reflectors of the camera in a first or second position, and may include instructions that configure the image processor 220 adjust the focus position of cameras 215a-n. Capture control module 235 may further include instructions that control the overall image capture functions of the device 200. For example, capture control module 235 may include instructions that call subroutines to configure the image processor 220 to capture raw image data of a target image scene using the cameras 215a-n. Capture control module 235 may then call the image stitching module 240 to perform a stitching technique on the N partial images captured by the cameras 215a-n and output a stitched and cropped target image to imaging processor 220. Capture control module 235 may also call the image stitching module 240 to perform a stitching operation on raw image data in order to output a preview image of a scene to be captured, and to update the preview image at certain time intervals or when the scene in the raw image data changes.

Image stitching module 240 may comprise instructions that configure the image processor 220 to perform stitching and cropping techniques on captured image data. For example, each of the N sensors 215a-n may capture a partial image comprising a portion of the target image according to each sensor's field of view. The fields of view may share areas of overlap, as described above and below. In order to output a single target image, image stitching module 240 may configure the image processor 220 to combine the multiple N partial images to produce a high-resolution target image. Target image generation may occur through known image stitching techniques. Examples of image stitching can be found in U.S. patent application Ser. No. 11/623,050 which is hereby incorporated by reference.

For example, image stitching module 240 may include instructions to compare the areas of overlap along the edges of the N partial images for matching features in order to determine rotation and alignment of the N partial images relative to one another. Due to rotation of partial images and/or the shape of the field of view of each sensor, the combined image may form an irregular shape. Therefore, after aligning and combining the N partial images, the image stitching module 240 may call subroutines which configure image processor 220 to crop the combined image to a desired shape and aspect ratio, for example a 4:3 rectangle or 1:1 square. The cropped image may be sent to the device processor 250 for display on the display 225 or for saving in the storage 210.

Operating system module 245 configures the image processor 220 to manage the working memory 205 and the processing resources of device 200. For example, operating system module 245 may include device drivers to manage hardware resources such as the cameras 215a-n. Therefore, in some embodiments, instructions contained in the image processing modules discussed above may not interact with these hardware resources directly, but instead interact through standard subroutines or APIs located in operating system component 245. Instructions within operating system 245 may then interact directly with these hardware components. Operating system module 245 may further configure the image processor 220 to share information with device processor 250.

Reflector control module 270 may configure the image processor 220 to generate instructions for an actuator or motor that transitions extendible reflectors of the camera between first and second positions in order to capture either a standard FOV image using just the center camera or a wide FOV image using the center camera in combination with the surrounding additional cameras. Reflector control module 270 can, for example, configure the image processor 220 to provide image capture mode selection controls to a user, for instance by using a touch-sensitive display 225, allowing the user of device 200 to select an image capture mode corresponding to either the standard FOV image or a wide FOV image. Based on the user selection, reflector control module 270 can configure the image processor 220 to provide appropriate instructions to means for transitioning the transitions extendible reflectors into the position corresponding to the user selection. In some embodiments, the extendible reflectors may be fixed in an extended position and the reflector control module 270 may be omitted.

Device processor 250 may be configured to control the display 225 to display the captured image, or a preview of the captured image, to a user. The display 225 may be external to the imaging device 200 or may be part of the imaging device 200. The display 225 may also be configured to provide a view finder displaying a preview image for a use prior to capturing an image, or may be configured to display a captured image stored in memory or recently captured by the user. The display 225 may comprise an LCD or LED screen, and may implement touch sensitive technologies.

Device processor 250 may write data to storage module 210, for example data representing captured images. While storage module 210 is represented graphically as a traditional disk device, those with skill in the art would understand that the storage module 210 may be configured as any storage media device. For example, the storage module 210 may include a disk drive, such as a floppy disk drive, hard disk drive, optical disk drive or magneto-optical disk drive, or a solid state memory such as a FLASH memory, RAM, ROM, and/or EEPROM. The storage module 210 can also include multiple memory units, and any one of the memory units may be configured to be within the image capture device 200, or may be external to the image capture device 200. For example, the storage module 210 may include a ROM memory containing system program instructions stored within the image capture device 200. The storage module 210 may also include memory cards or high speed memories configured to store captured images which may be removable from the camera.

Although FIG. 2 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance. Additionally, although FIG. 2 illustrates two memory components, including memory component 230 comprising several modules and a separate memory 205 comprising a working memory, one with skill in the art would recognize several embodiments utilizing different memory architectures. For example, a design may utilize ROM or static RAM memory for the storage of processor instructions implementing the modules contained in memory component 230. The processor instructions may be loaded into RAM to facilitate execution by the image processor 220. For example, working memory 205 may comprise RAM memory, with instructions loaded into working memory 205 before execution by the processor 220.

III. Overview of Ultra-Wide Field of View Array Camera

An objective of some embodiments of the wide field of view array cameras described herein is to design a high resolution camera with a hemispherical field of view for a mobile computing device having a desired thin form factor, for example a mobile phone. As described above, typical mobile phones use cameras that have a diagonal field of view (DFOV) between 64 degrees to 76 degrees, which is approximately equivalent to pictures captured by a "full frame" DSLR camera with a 35 mm or a 28 mm focal length lens, respectively. Largely because of the wide use of mobile phone cameras, images captured with lenses that are equivalent in field of view to a 35 mm full frame DSLR lens are now considered by many people to produce the most natural looking pictures. Therefore it can be desirable for some implementations of the wide field of view array camera to be able to capture pictures with a typical DFOV, as well as wider DFOV pictures and hemisphere pictures.

Capturing pictures with a DFOV that is much wider than 76 degrees is difficult to implement using a single camera for at least the following reasons: (1) as the field of view of a single camera increases the relative illumination roll-off increases, (2) wide field of view lenses used in small mobile cameras typically have significant drop in modulation transfer function (MTF) performance at the edges of the field of view compared to the center, and (3) manufacturing tolerances are tighter for mobile cameras because lens decentering and tilting will further reduce the MTF near the edges of the field of view. These problems, among others, are solved in some embodiments by the multi-camera array described herein, which can provide a good solution to the challenges of using just one camera to capture images having a field of view wider than approximately 76 degrees. Each camera of the array of will see part of the total image; hence each camera will have a narrower field of view than a single camera used to capture an image with a similar field of view. This may result in each of the array cameras having less relative illumination lens roll-off at the outer edges of each lens in comparison to the single camera, and that may correspondingly result in a more uniform illumination across the image, depending on the number of cameras used. Similarly the MTF reduction at the edges of each field of view will be lower than if a single camera was used to capture the image.

The array of cameras can be configured according to predetermined spatial relationships in order to capture different parts of the target image scene without parallax artifacts for more easy stitching of the images and less loss of image data (and loss of field of view) during stitching. For example, due to the predetermined spatial relationship between the cameras in the array, all cameras can effectively capture the pictures through one common entrance pupil. Using a set of equations such as provided in this disclosure the array of cameras can be positioned so that they will appear to have one common entrance pupil. In addition the equations provide information regarding how to place the cameras so that the rays of light coming from objects in the target image scene will not be blocked by the location of the camera. This disclosure provides several specific examples regarding the spatial relationship that enables the array camera to accomplish this while capturing a hemispherical or spherical image. Specific examples are provided to show this design can be incorporated in a thin cell phone, for example, a cell phone that is approximately 5.5 mm thick, however implementations of the wide field of view array camera in thicker devices can be constructed according to different parameters. Configurations using two of these camera hemisphere designs back-to-back can yield a full "global" camera capable of producing a spherical image, that is, an image of a spherical viewpoint extending from the device in all directions. The disclosed embodiments can be incorporated into a cell phone or other mobile device with a desired thin form factor.

In some embodiments, a small globe with lenses and/or other imaging components may extend out of a phone or other mobile computing device, for example, extend from the front and back of the phone, or the top and bottom of the phone, to provide a spherical view surrounding the phone. This disclosure includes configurations that will make it possible to capture very high resolution images with wide fields of view using relatively small cameras. These images can be the normal 65 degree DFOV images captured by mobile cameras, wide angle images having a field of view of 90 degrees or greater, and narrower DFOV images such as 50 degrees DFOV. Different other types of configuration options are also point out in this disclosure. The reflective surfaces used to separate the target image scene into multiple portions can be smooth flat surfaces or smooth curved surfaces. The smooth surfaces will help prevent or minimize alignment issues of the camera to the reflector. Flat images potentially could have artifacts due to incorrect alignment of the cameras and the reflectors.

One example of a wide field of view array camera application is capturing hemisphere pictures with a cell phone or other portable computing device where the edges of the hemisphere are perpendicular to the plane of the body of the computing device. These pictures can be viewed using 3D goggles to form a virtually reality experience where the viewer (user) may be "immersed" in the image, that is, such that the viewer can view imagery in every direction. In other examples these pictures can be flattened for display on a typical panel display. The is also true of configurations described herein that allow an imaging device to create an image in all directions of the imaging device, that is, a spherical field of view image that is a global view surrounding the imaging device.

Figure 3A:
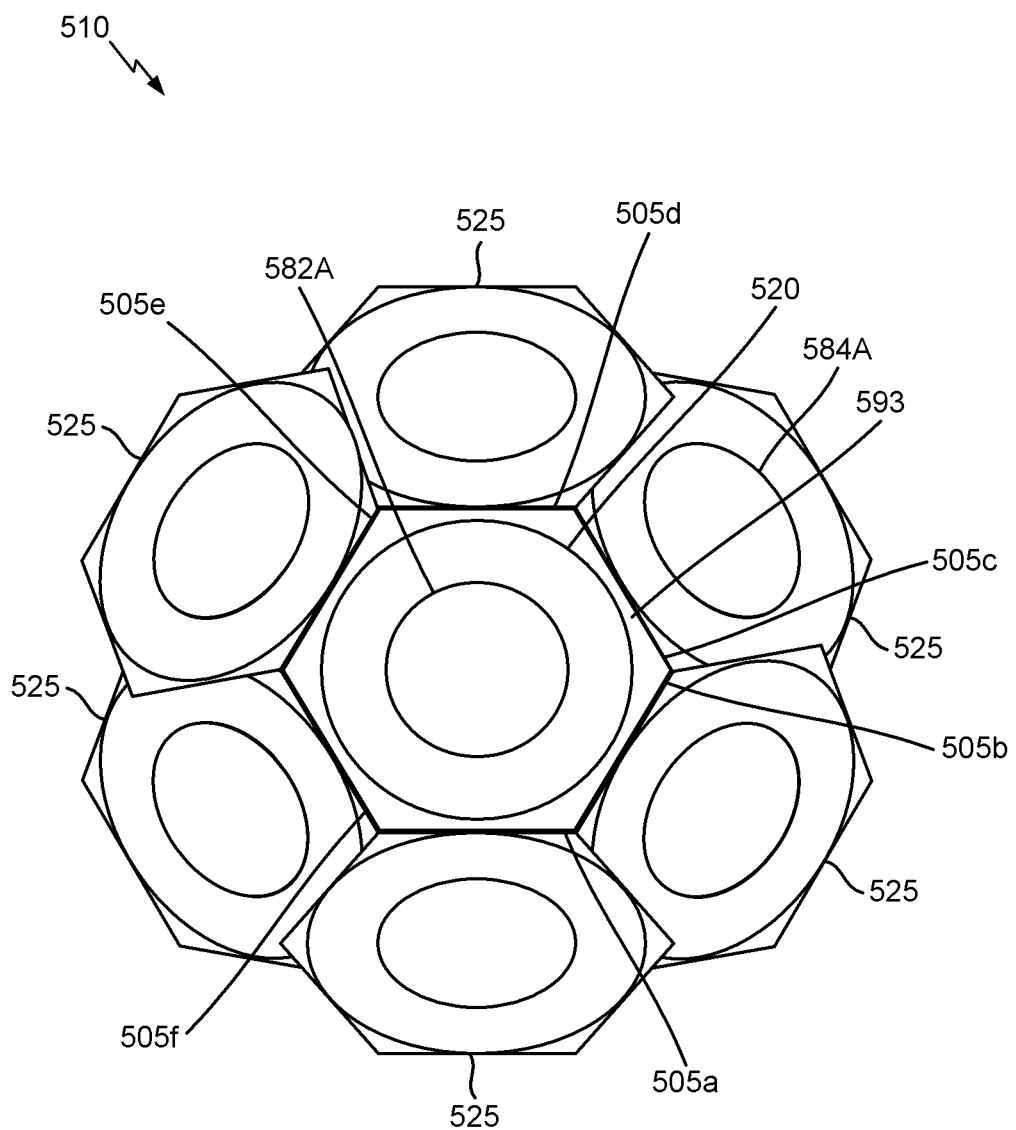
FIGS. 3A-3B illustrate an example of an embodiment of a hemisphere camera array where reflectors (for example, mirrors) are extended for a hemisphere or a wide field-of-view (FOV) option.
Figure 3B:
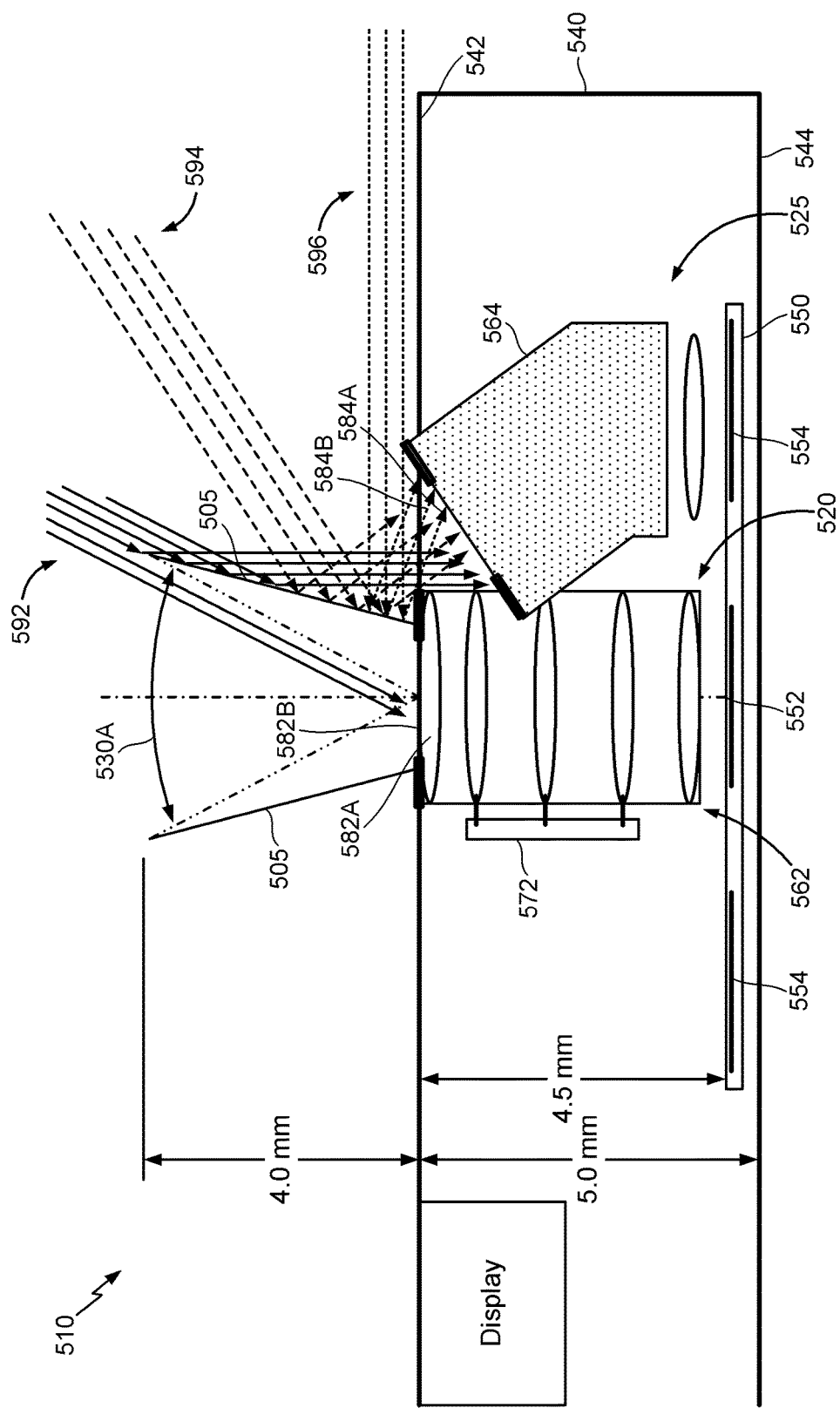
Figure 3C:
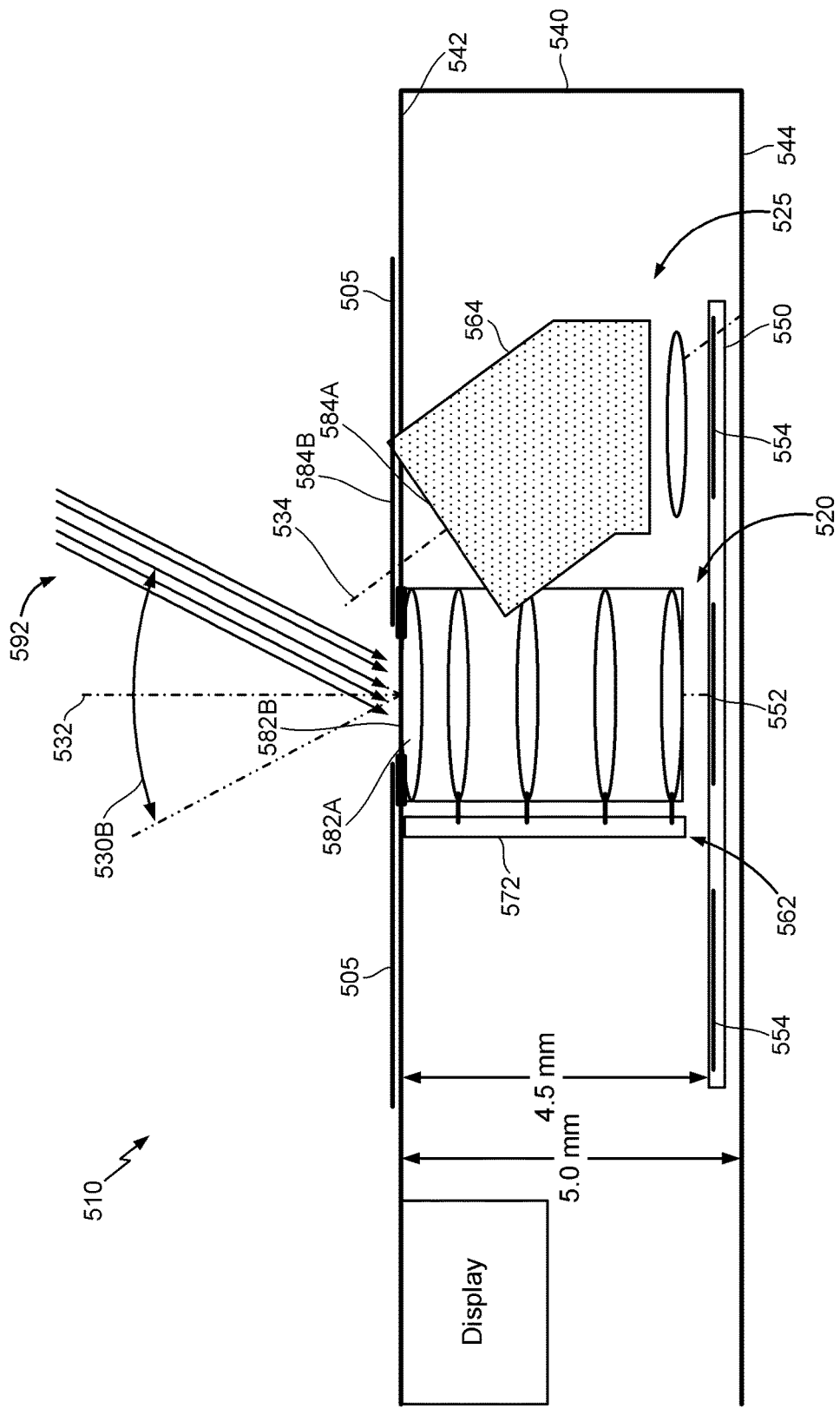
FIG. 3C illustrates an example the hemisphere camera array of FIG. 3A where the reflectors (for example, mirrors) are retracted in a configuration for general use, in other words, a non-hemispherical imaging configuration.

FIGS. 3A and 3B illustrate an example of an embodiment of a wide field of view array camera 510 (also referred to as hemisphere array camera 510). As illustrated in a top view of the camera 510 in FIG. 3A, camera 510 includes extendible reflectors 505a-f. The extendible reflectors 505 are also shown in a side view cutaway in FIG. 3B. In this embodiment, the extendible reflectors 505 are structures including at least a mirrored surface, and are positioned surrounding a center camera 520. FIG. 3B shows the side view cutaway of the extendable reflectors 505, where the camera has been configured as a hemisphere or a wide field-of-view (FOV) option. FIG. 3C, shows the extendable reflectors 505 retracted, where the center camera has FOV that does not form a hemispheric camera or as wide a FOV compared to when the extendable reflectors 505 are extended (for example, the FOV of the center camera 520 may have a FOV less than that of the side camera 525 with the mirrors 505 are extended). As shown in FIG. 3C the extendable reflectors 505 cover the surrounding cameras 525 when the mirrors 505 are retracted. It is not necessary the extendable mirrors 505 cover the surrounding cameras because the images from these surrounding cameras either may or may not be used or the cameras may be turned off. Other embodiments may include additional features, or less features.

As one of ordinary skill in the art will appreciate, for clarity of illustration FIGS. 3A-3C may not include every implementation detail of the wide field of view camera 510. FIG. 3A provides a top view of the hemisphere array camera 510 as seen without a covering camera housing with the array of cameras exposed. FIG. 3B provides a cutaway cross-sectional view of the hemisphere array camera 510 within housing 540 showing the center camera 520 and sensor areas for two periphery cameras with extendible reflectors 505 in an extended configuration. FIG. 3C provides a cutaway cross-sectional view of the hemisphere array camera 510 within housing 540 showing the center camera 520 and sensor areas for one periphery cameras with extendible reflectors 505 in a retracted configuration. For FIGS. 3B and 3C the optical elements of one periphery camera are schematically illustrated as a block diagram, however it will be understood that each periphery camera includes such optical elements, and that such optical elements could include a lens assembly and one or more optical folding elements to redirect received light downward onto the corresponding sensor.

In the illustrated embodiment of FIG. 3A, there is a wide field of view array camera 510 having six periphery cameras 525, surrounding a center camera 520. The center camera 520 has an entrance pupil 582A and each periphery camera 525 has an entrance pupil 584A. A plane perpendicular to the optical axis of one of the peripheral cameras and containing the entrance pupil 584A of that particular periphery camera 525 may be tilted relative to a plane perpendicular to the center camera 520 optical axis and containing the entrance pupil 582A of the center camera 520. In an example of a side view illustrated in FIG. 3B, extendible reflectors 505 are extended for creating a wide field-of-view (FOV) image, for example, a 180 degree hemispherical image. The extended extendible reflectors 505 may protrude approximately 4.0 mm from upper surface 542 of the camera housing as illustrated, or may protrude smaller or greater distances in other embodiments depending on parameters developed for the desired design. The illustrated dimensions are provided to show one specific example of the wide field of view array camera 510 having a relatively thin form factor suitable for use in a portable computing device, and not to limit the possibly dimensions of other examples of the camera 510.

In the embodiment illustrated in FIG. 3B, the hemisphere array camera 510 may be positioned within a camera housing 540. The camera housing 540 may include an upper surface 542 spaced apart from a lower surface 544. In some embodiments, the upper surface 542 and the lower surface 544 may be spaced apart by, for example, approximately 5.0 mm as shown, to form a thin camera. In other embodiments the spacing may be greater or less. Image sensing substrate 550 can be positioned adjacent to or secured to the lower surface 544. Image sensing substrate may include a center sensing area 552 associated with center lens assembly 562 and positioned below center aperture 582B, which may be in the upper surface 542. The center aperture 582B in the upper surface 542 can be aligned with (or can form, in some examples) the entrance pupil 582A of center camera 520. In some embodiments, and as illustrated in FIG. 3B, the center sensing area 552, center lens assembly 562, and autofocus means 572 (which may be an actuator or a mechanical linkage transferring actuator motion from a remote location to the lens assembly 562) make up the center camera 520. The center sensing area 552 may be manufactured on the substrate 550, or they may be connected to the substrate 550. Center lens assembly 562 is illustrated with a particular number and configuration of lenses for purposes of example, and this lens configuration is not intended to limit the possible lens assemblies that can be used for center camera 520. The central camera sensor area 552 does not have to be located on a common substrate 550 that may contain the sensor areas 554 of the surrounding cameras such as 525. Each sensor area 552 and 554 may be located on different substrates with respect to each other. Other embodiments also may apply.

Center camera 520 has field of view 530A and such a FOV allows some of light rays 592 to enter from above the camera 510 when the extendible reflectors 505 are positioned in the extended configuration illustrated in FIG. 3B. The surfaces of the extendible reflectors 505 facing toward the center aperture 582B can be constructed from or coated (or provided) with a material that absorbs light rather than reflects light, for example a black non-reflective (or substantially non-reflective) material, to minimize stray light that may come from light outside the FOV 530A or possible reflections or other factors related to light within the FOV 530A, which may pass through aperture 582B toward the center camera 520. The field of view 530B in FIG. 3C may be wider than the FOV 530A in FIG. 3A when the extendable reflectors 505 are extended. This may occur if the extendable reflectors 505 in FIG. 3B reduce the FOV of the scene observed by the center camera 520 to a narrower FOV 530A as compared to possible wider FOV 530B.

The image sensing substrate 550 may include a number of periphery sensing areas 554 each associated with a periphery optical element 564 positioned below a periphery aperture 584B in the upper surface 542. The periphery aperture 584B in upper surface 542 can be aligned with (or can form, in some examples) the entrance pupil 584A of the periphery camera 525. In various embodiments, each periphery sensing area 554 of a plurality of periphery sensing areas 554 arranged around the center sensing area 552 may be manufactured on a the substrate 550, or they may be connected to the substrate 550, or may be on separate substrates that are not connected to the sensing area 554 of the other peripheral cameras 525. Each periphery optical element 564 can include one or more lenses or other light focusing structures and one or more light folding surfaces (for example, reflective mirrors or refractive solids) in order to focus and guide light entering through the periphery aperture 584B onto the periphery sensing area 554. Each peripheral camera 525 may contain a method to focus the lens of the camera (located within optical element 564) that is controlled by an actuator or other similar device. For clarity of illustration only one periphery optical element 564 is shown, however each periphery camera 525 can have a periphery optical element for focusing and guiding entering light.

When the extendible reflectors 505 are in the extended configuration illustrated in FIG. 3B, light rays 594, 596 entering from the side of the camera 510 in an angular range between an angle formed between the extendible reflector 505 in the extended configuration and the upper surface 542 to an angle parallel with the upper surface 542, as illustrated by rays 596, are reflected through the periphery aperture 584A and periphery optical element 564 onto the periphery sensing area 554. In some embodiments, camera enclosure aperture 584B can be slightly wider than the camera aperture 584A. Only the rays passing through aperture 584A may ultimately end up on the imaging area 554. Within the camera, clipping may occur that may stop some of the rays entering 584A reaching the image sensing area 554. A portion of light rays 592 entering from above the camera 510 are also reflected through the periphery aperture 584A and periphery optical element 564 onto the periphery sensing area 554. When the extendible reflectors 505 are positioned in a retracted configuration against the camera housing 540 the apertures 584B and or 584A may be obstructed and no light may pass to the periphery sensing area 554.

The surface of the extendible reflector 505 facing toward the periphery camera aperture 584A can be constructed from or provided with a mirror or reflective surface. In some embodiments, the mirror or reflective surface can be substantially flat, and in other embodiments it can be a concave or convex surface. The concavity or convexity of the surface can be taken into account when designing the periphery optical element 564 to achieve desired imaging performance and or other aspects on the periphery sensing area 554

In FIG. 3B light rays 592 are shown substantially parallel to each other and may be considered to be coming from a point far way in the object space. As shown in FIG. 3B some of the rays in 592 may travel on to and may enter aperture 582A of the central camera and may subsequently be imaged on sensor surface 552. The extendable mirror 505, when extended, may reflect some of the rays 592 towards aperture 584A of a peripheral camera 564. These rays may travel on and be imaged on that camera 564 associated imaging sensor surface 554. It may be possible to see the image of the same point in the object space from which light rays 592 emanated in the image projected on image sensor surface 552 and in the image projected on image sensor surface 554. The images of the same point on surfaces 552 and 554 may be lower in light level than that of the central camera when the retractable mirror 505 is retracted. It may be possible to stitch the images projected on surfaces 552 and 554 together through using image processing techniques that may minimize or substantially minimize stitching artifacts. Although the examples herein are discussed primarily within the context of extendible reflectors that can be transitioned between the extended state shown in FIG. 3B and a retracted state, some embodiments may have reflectors permanently affixed in an extended state, for example as a structure approximating the shape of an inverted cone.

FIG. 3C illustrates an example of the embodiment of the hemisphere camera array 510 of FIG. 3B where the extendible reflectors 505 are retracted to be substantially parallel to the upper surface 542 of the camera housing 540 in a configuration for general use, in other words, a standard FOV imaging mode or a non-hemispherical imaging configuration. One advantage of such an implementation having a central camera 520 is that it is possible to retract the extendible reflectors 505 and have one camera (for example, the center camera 520) for general use.

FIG. 3C also illustrates the optical axis 532 of the center camera 520. In some embodiments, each periphery camera 525 can be arranged around the center camera 520 such that an optical axis 534 of each periphery camera lens assembly (located within optical element 564) intersect or substantially pass near a common intersect point on the optical axis 532 of the center camera 520. This common intersection point can be located using the model shown in FIG. 5A, which will be described further below.

Figure 4A:
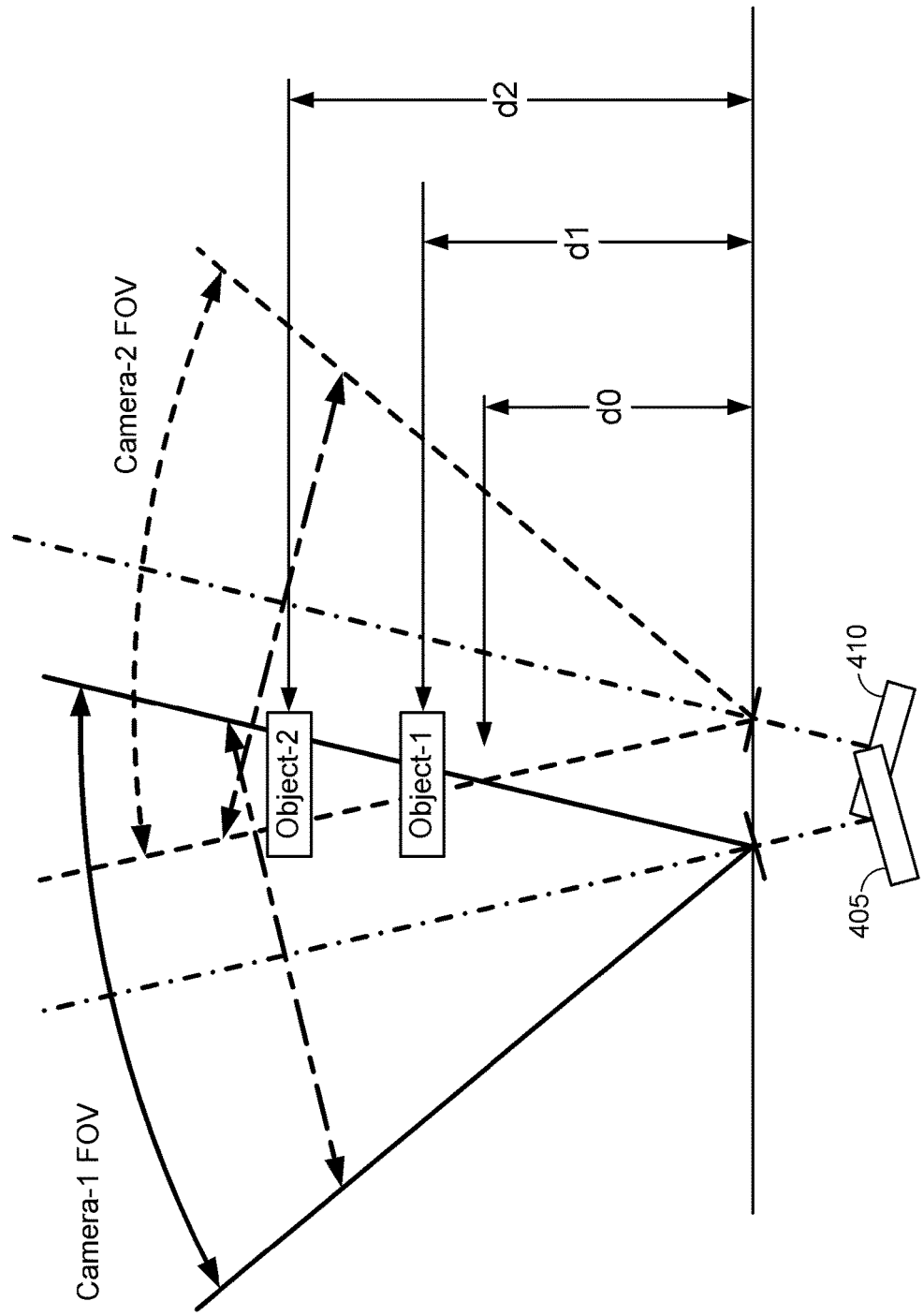
FIG. 4A illustrates a field-of-view (FOV) of a first camera (camera-1 FOV) and a FOV of a second camera (camera-2 FOV) where an object-1 and an object-2 are at least partially in each FOV, that is, in both Camera-1 FOV and Camera-2 FOV.

FIG. 4A illustrates a field-of-view (FOV) of a first camera (Camera-1 FOV) and its associated image sensor 405. FIG. 4A also shows the FOV of a second camera (Camera-2 FOV) and its associated image sensor 410. In FIG. 4A the physical shape of Camera-1 and Camera-2 are not shown, where instead the FOV of each camera and the associated image sensors 405 and 410 are shown, respectively. Object-1 and an Object-2 are at least partially in each FOV of both Camera-1 and Camera-2, illustrating an example of how parallax image stitching artifacts can occur. In this example two cameras are used to capture overlapping images. These two images are then stitched together to make one larger image. Unless both cameras share the same entrance pupil, as shown at location 417 of FIG. 4B there will likely be parallax stitching artifacts.

To better understand how parallax stitching artifacts can occur, Object-1, shown in FIG. 4A can be thought of as moving towards distance d0, where the number of overlapping pixels on the image surface of sensor 405 and the image surface of sensor 410 decreases towards one or zero pixels. When Object-1 was at location d1 the number of overlapping pixels are shown to be more than one pixel. Further, if there is another object, such as Object-2, at distance d2 one can see there are more overlapping pixels than that for Object-1 at distance d1. The problem becomes apparent when one try's to cut the images captured by image sensors 405 and 410 along an edge of each image and then stitch them together. If you use the edge associated with distance d0 then portions of the Object-2 at distance d2 will be in both figures, whereas an object located at distance d0 will have one or zero pixels in common in both images.

Figure 4B:
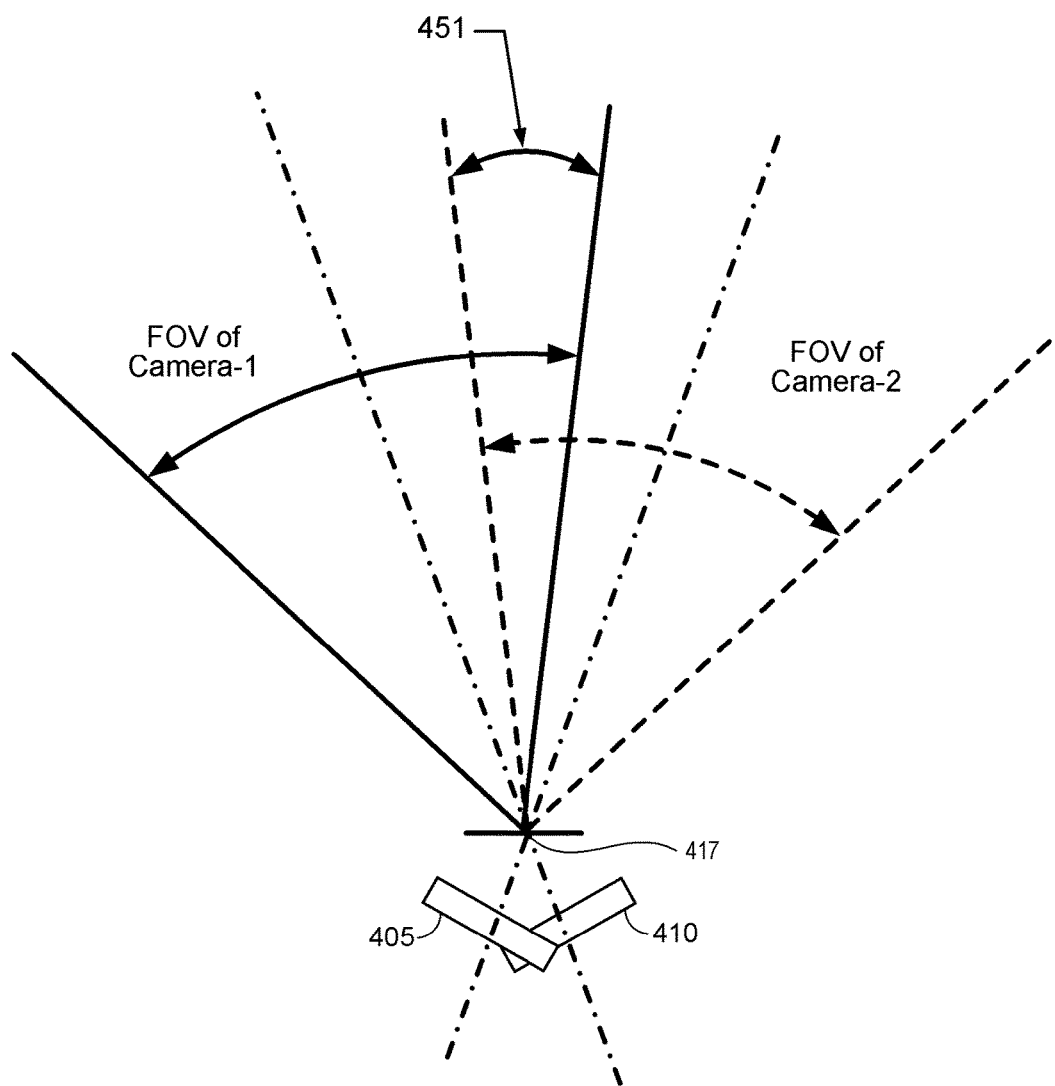
FIG. 4B illustrates the overlapping region of a FOV of Camera 1 and a FOV of Camera 2.

FIG. 4B illustrates the overlapping region 451 of the FOV of both cameras Camera-1 and Camera-2. One issue addressed in this disclosure is how to arrange (or position) a plurality of cameras (for example, an array of cameras) so that all the cameras share one common entrance pupil. Cameras-1 and Camera-2 are shown in FIGS. 4B and 4C as sharing one common pupil 417.

Figure 4C:
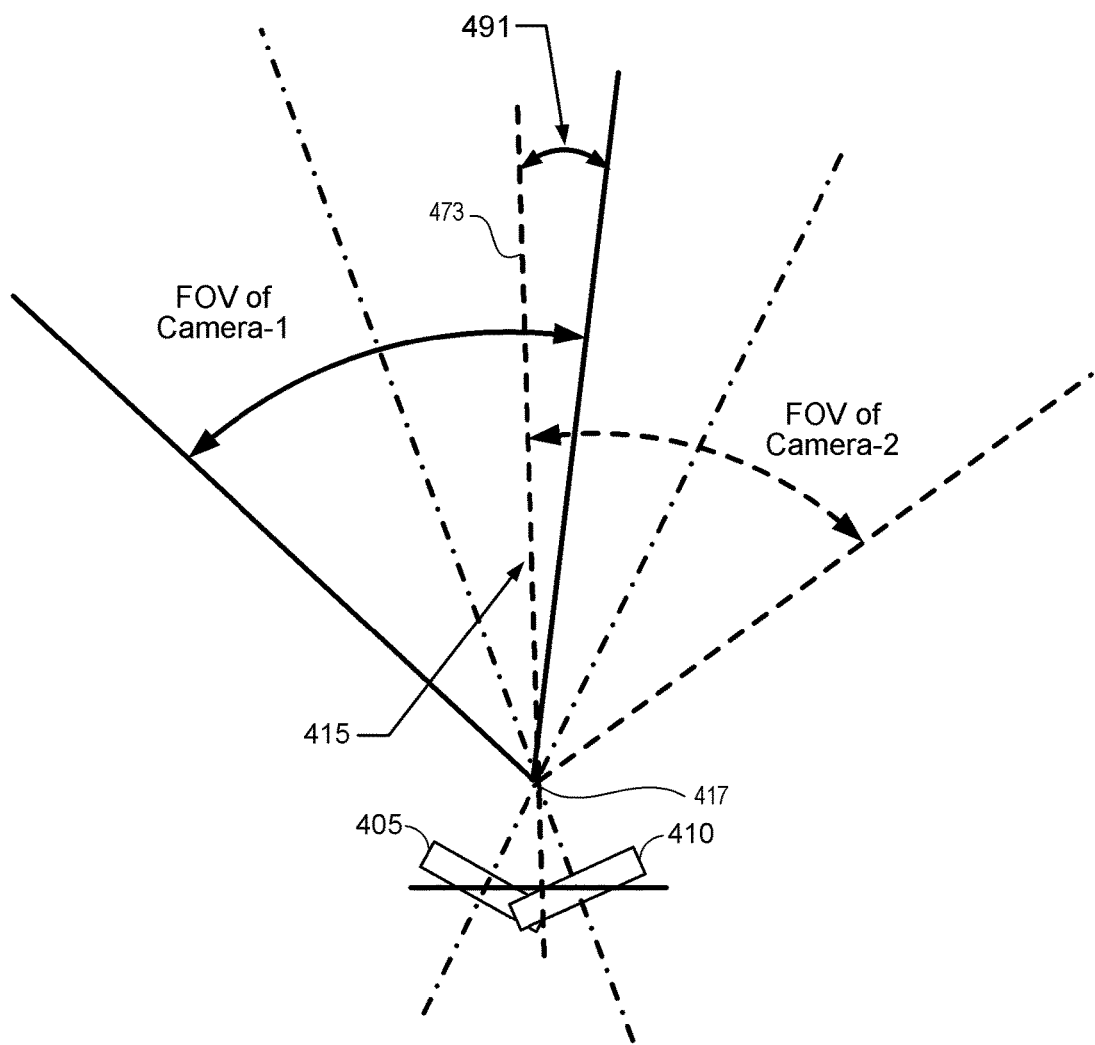
FIG. 4C illustrates the overlapping region of a FOV of Camera 1 and a FOV of Camera 2 where the optical axis of Camera 2 is rotated with respect to Camera 1, and where the ray of the edge of Camera 2 is used as an example to trace the ray to each sensor.

FIG. 4C is similar to FIG. 4B, where there is an overlapping region 491 of the Fields of Views of Camera-1 and Camera-2. As shown one edge of the FOV for Camera-2 473 is extended and intersects the image surface of both image sensors 405 and 410. Notice that the intersection point of lined 473 on the image surface of image sensors 405 and 410 does not change as a function of the distance of a point on line 473 from the pupil 417. One skilled in the art should be able to appreciate from this example that when cameras share the same common entrance pupil, the images captured by those cameras can be cut along continuous lines found in both images and have in principle substantially minimal to no stitching artifacts. Sometimes a plurality of cameras arrange with a common pupil are described as being "Parallax Free" with respect to stitching artifacts as described for FIG. 1A. FIG. 4C illustrates another point about rotation. The optical axis of the camera-2 image sensor 405 can be rotated in pitch, yaw and roll angular rotations. Roll will rotate the sensor. As long as the two optical axes of both cameras 405, 410 share a common entrance pupil it is possible to know what pixels are overlapped and be able to merge the two images to produce one image without or nearly substantially without parallax artifacts.

Figure 5A:
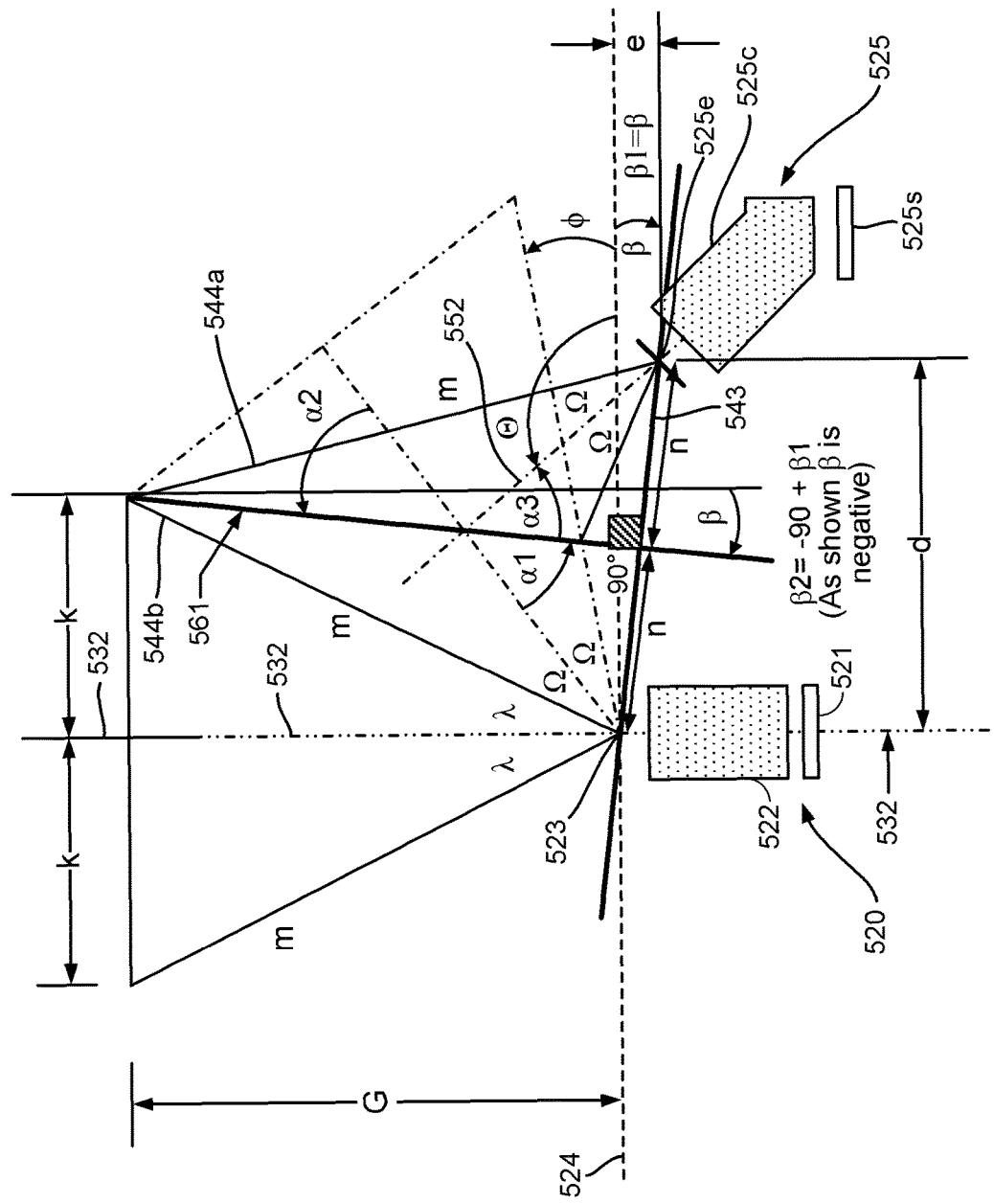
FIG. 5A illustrates an example of an embodiment of a parallax free model.
Figure 5B:
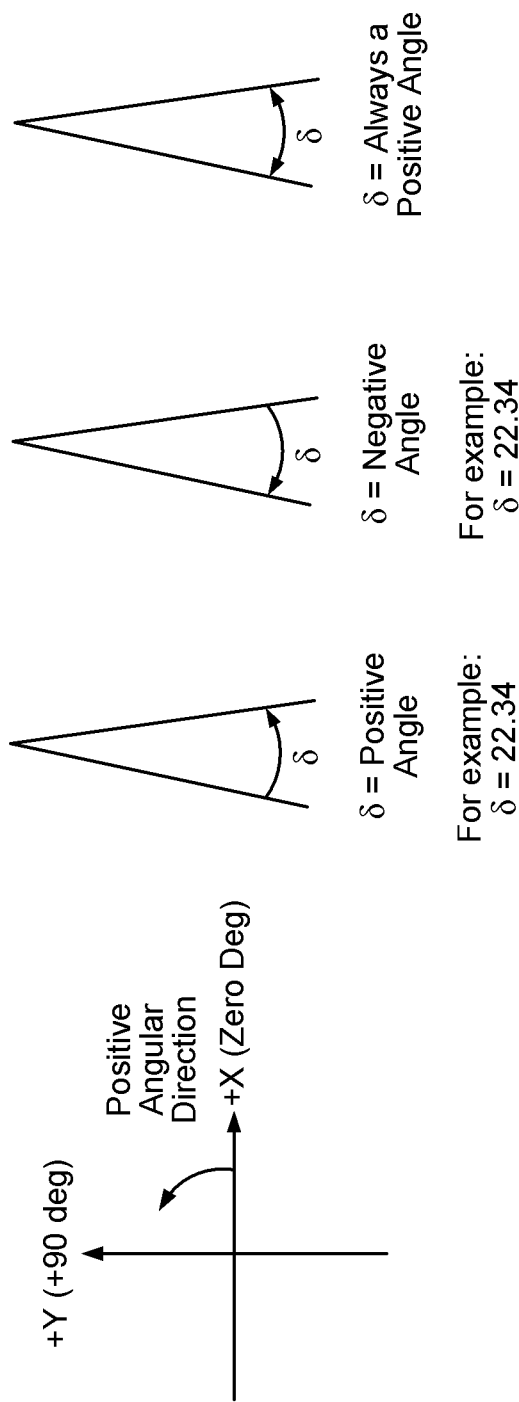
FIG. 5B illustrates a legend for the angle notations used in FIG. 5A.

FIG. 5A illustrates an example of an embodiment of a model parallax free or substantially parallax free array camera system using a central camera 520 like that shown in FIGS. 3A, 3B and 3C. FIG. 5B shows the legend to use with respect to FIG. 5A and Tables 1 and 2, where positive angles are shown as counter clockwise rotation angles, negative angles are shown as clockwise rotation angles, angles with double arrow heads are always positive angles together with the Cartesian coordinate system for X and Y linear directions and for angles starting at zero degrees on the X axis and increases positively in the counter clockwise rotation direction. In FIG. 5A, camera 520 includes an image sensor 521, optical components 522 and an entrance pupil center point 523. The optical axis 532 represents the optical axis of camera 520. The location of the entrance pupil of camera 520 does not have to be placed in front of the optical components 522. It is possible for the entrance pupil to be within the optical components 522 or anywhere in front of the sensor 521. Lines 524 and 532 intersect each other orthogonally at the entrance pupil center point 523. The entrance pupil center point 523 is referred to as coordinate location (0, 0), that is location (zero, zero), which means the zero location along the line 524, and the zero location along the line 532.

In FIG. 5A a distance "d" is shown and a distance "e" is shown relative to the origin (0, 0) and the lines 524 and 532. Table 1 provides equations that provide the distances "e" and "d" along with the optical axis angle theta ($\Theta$) for the peripheral camera 525 once the input values for G, Lambda ($\lambda$), Omega ($\Omega$) and the mirror angle Beta ($\beta$) is given. Camera 525 as shown in FIG. 5A includes the sensor 525$s$, components 525$c$ and the entrance pupil center point 525$e$.

Entrance pupil 525e is located at point (d, e). The other angels and distances shown in FIG. 5A are there to help one understand the model shown in FIG. 5A and to be able to derive the equations shown in Table 1.

To fully explain the equations in Table 1 a design example shown in Table 2 will be used. The line 524 is perpendicular to the optical axis 532 and intersects at coordinate (0, 0). The central camera half FOV angle Lambda is 30 degrees as shown in Table 2. One of the peripheral cameras 525 is shown to have a half FOV angle Omega of 30 degrees. The height G is between the top of the mirror 561 to line 524. The design procedure one may use is to choose values for G, Lambda and Omega first. The next step is to vary Beta and height G until a realizable solution can be found. If one has the physical dimensions of the central camera 520 and the peripheral cameras 525, then the objective may be to look for an angle Beta and height G combination that will allow the central camera 520 to physically fit within the peripheral cameras 525 surrounding the central camera 520. By changing the values of Beta and height G the equations presented can be used to determine the values of "d", "e" and Theta, where theta is the optical axis angle of the optical axis 552 of one of the cameras 525.

As shown in FIG. 5A the optical axis 552 for any of the peripheral cameras is in the same plane as point (d, e) and line 532. FIG. 5A shows lines 532 and 552 on the same plane as the page showing FIG. 5A. The mirror surface 561 lays on a the plane surface that is perpendicular to plane formed by point (d, e), line 552, and line 532. The mirror surface angle Beta and the equations in Table 2 will yield angles alpha (α) 1, 2, and 3 (i.e. α1, α2, and α3) that are all equal to the same value. In Table 2 the value of alpha 1, 2 and 3 are all shown as 45 degrees. Based on the laws of reflection the angles alpha 2 and alpha 3 should be equal. On may notice that the mirror surface 561 should also intersect the line 543 that connects points (0,0) and (d,e) at location (0.5*d, 0.5*e). One should now be able to show that rays of light traveling within the plane of the page for FIG. 5A alone a path parallel to line 544b from the object space towards point (Zero, Zero) will separate at the point (k,G) that is part of line 544b and some of the rays will travel on to the entrance pupil around point 523 and others will reflect off of the mirror surface 561, where some of these rays will enter the entrance pupil of a the camera 525 around the point (d,e) shown on the page of FIG. 5A. FIG. 3B helps to show this by observing the path of rays 592 in FIG. 3B.

If one examines FIG. 5A closely they may observe that that each peripheral camera 525 appears to have a virtual camera whose entrance pupil is at a virtual location (0, 0) as a result of using the mirror 561 and whose optical axis lays on the same plane of the page and whose optical axis intersects at the same location on the mirror surface 561 as the optical axis of a the peripheral camera 525 shown with its optical axis on the plane of the page. One may also observe that the reflected optical axis off the mirror 561 points in the same direction as the virtual optical axis from the virtual camera and both the reflected optical axis and the virtual optical axis are on the same line as they extend out past the mirror into the object space.

One should also be able to see that the virtual camera will see the same FOV as the actual camera 525, where the FOV of the virtual and actual camera are limited by the edges of the mirror surface parallel to the plane of the mirror 561. The edges of the each of the mirror surfaces for each of the surrounding peripheral cameras 525 about a the central camera 520 is bounded by the intersection of all mirrors and the plane perpendicular to line 532 and contains point (0, G).

As shown in FIG. 5A all mirror surfaces lay on the surface of a plane. FIG. 3A shows six peripheral cameras with six flat mirror surfaces forming a hexagonal surface 593 at a the height G of a the array camera arrangement described wherein.

As shown in Table 2 below, the sum of the angles lambda plus two times omega is (30+60), that is, a total of 90 degrees. Table 2 describes the arrangement of the six peripheral cameras forming a hemisphere image. One may increase or decrease the values of lambda and/or omega to achieve particular aspects in order to achieve a wide FOV camera with less than or more than a hemisphere FOV or to accommodate other aspect of the design necessary to fit a particular form factor or other aspects.

One factor to consider is the edges of the mirror surface 505 shown in FIG. 3B is the light rays 592, shown in FIG. 3A are split where some light travels on to the central camera and some of these rays enter the entrance pupil of the central camera. Likewise some of the rays traveling with the light rays 592 will reflect off mirror 505 and some of those rays will enter the entrance pupil of a the surrounding camera 525 as shown in FIG. 3A. In the image one may see as lowering of light level where these rays have been reduce by the splitting done by the mirror edges and the size and location of the entrance pupil. One can then use synthetic aperture techniques to restore the light level along the edges and stitch them together with substantially minimum stitching artifacts.

TABLE 1

Input Values: G, λ, Ω and β
Equations:

β = The difference between the tilt of the mirror reflective surface and the shown vertical line, which is parallel to the Central Axis of the Camera Array. β can be +/−
β1 = β (as shown β1 = neg angle)
β2 = −90 + β1
φ = 90 − (λ + 2Ω)
m = G/cos(λ)
k = m * sin(λ)
n = m * cos(2Ω − β1 + φ)
e = 2n * sin(β1)
d = 2n * cos(β1)
α3 = angle of Camera A's optical axis with respect to the mirror surface.
α1 = 90 − (Ω + φ − β1))
α2 = α1
α3 = α2
Θ = 180 − (180 − (Ω + φ + α3 + α1))

TABLE 2

| Input | | |
|---|---|---|
| G | 4 | mm |
| λ | 30 | deg |
| Ω | 30 | deg |
| β | −15 | deg |

| Output | | | |
|---|---|---|---|
| β1 | −15 | = β | deg |
| β2 | −105 | = −90 + β1 | deg |
| φ | 0 | = 90 − (λ + 2Ω) | deg |
| m | 4.618802154 | = G/COS(λ) | mm |
| k | 2.309401077 | = m * SIN(λ) | mm |
| n | 1.195433963 | = m * cos(2Ω − β1 + φ) | mm |
| e | −0.618802154 | = 2n * sin(β1) | mm |
| d | 2.309401077 | = 2n * cos(β1) | mm |
| α1 | 45 | = 90 − (Ω + φ − β1) | deg |

TABLE 2-continued

| | | | |
|---|---|---|---|
| α2 | 45 | = α1 | deg |
| α3 | 45 | = α2 | deg |
| Θ | 120 | = 180 − (180 − (Ω + φ + α3 + α1)) | deg |

Figure 5C:
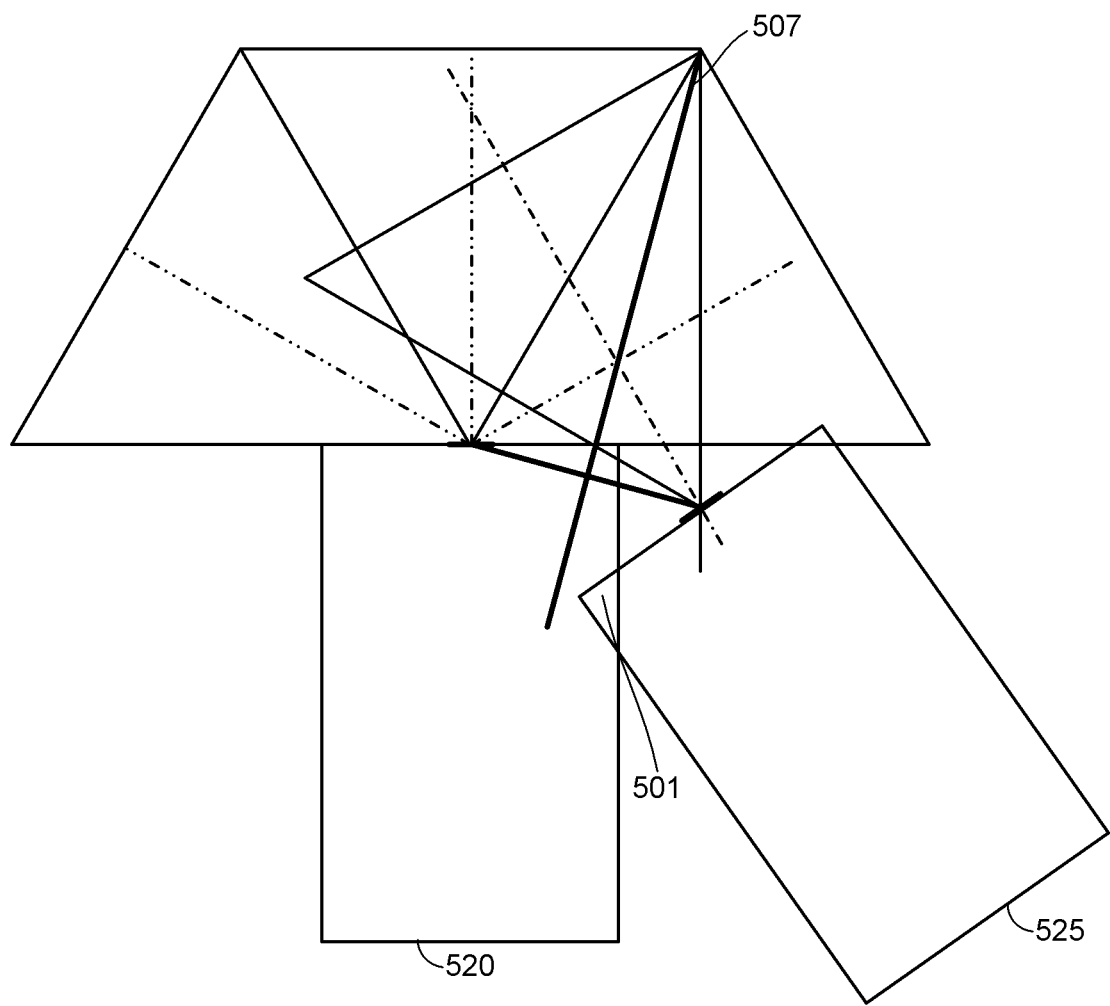
FIG. 5C illustrates an example of an embodiment of a central camera and peripheral camera design.

FIG. 5C illustrates an example of an embodiment of a central camera 520 and peripheral camera 525 design drawn to match the dimensions of the input and output values of Table 2, above. In the design of FIG. 5C, one solution for the space conflict 501 between the optical elements of central camera 520 and peripheral camera 525 is to increase the height of the reflector 507, as shown in FIG. 5C. Other solutions may involve modifying the optics of the peripheral camera 525 so as to not occupy the same space as the central camera 520, for instance through folded optics (e.g., one or more suitably sized and placed reflective or refractive elements). The estimate size for the lens assembly of each camera 520, 525 is approximately 3.0 mm in height and width by approximately 5.0 mm long.

Figure 6A:
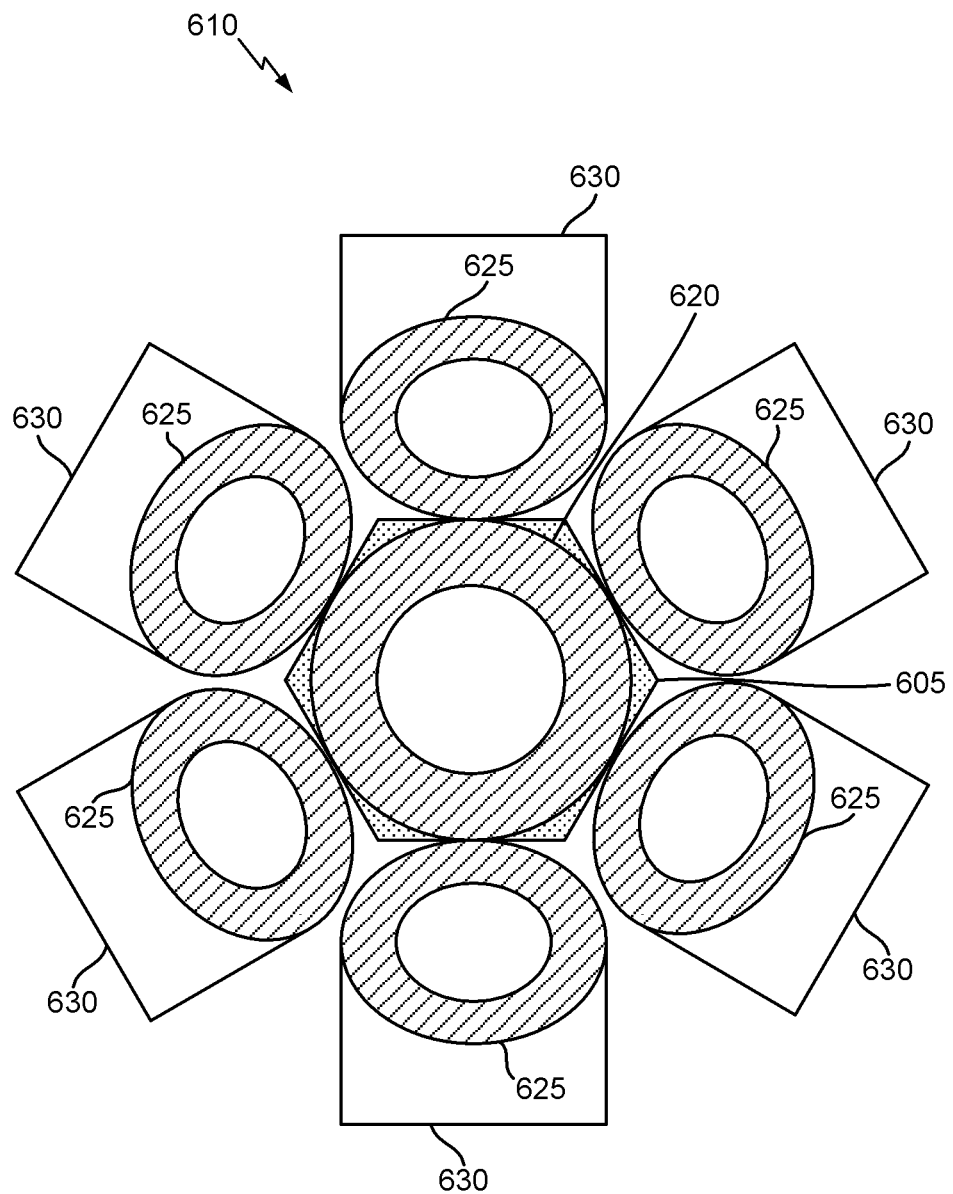
FIG. 6A illustrates an arrangement of components of an imaging system (for example, an array camera) that can generate a hemispherical image.

FIG. 6A illustrates a top view of one example of an embodiment of an arrangement of components of an imaging system (for example, a wide field of view array camera as described herein) that can generate a hemispherical image. The lenses of each peripheral camera 625 are pointed in towards the central camera 620 and the camera housing and reflectors are not shown for purposes of illustrating the internal camera configuration. The reflectors, when extended, may be disposed near or along the illustrated hexagon-shaped region 605 surrounding the central camera 620. A suitable mechanical-optical design of each of the cameras 625 can integrate all lenses in a common module for minimum space and desired dimensions. Each of the cameras 625 surrounding the center camera 620 may use prisms, mirrors, or other equivalent optical components to effectively re-direct (or fold) light through the cameras 625. In some embodiments, all the sensors 630 of the surrounding cameras 625 are disposed on the same substrate as the sensor of the central camera 620. The substrate, in one example, can be cut from a single silicon wafer with all the sensors areas disposed on the wafer. Such an arrangement allows the digital and analog processing of one sensor area to be shared in common with all sensors on the substrate. It also allows for the digital data transport system such as the camera MIPI interfaces to use less space on the sensor and save power. However, using a single wafer for all sensor areas may waste expensive material if there are large unused areas of sensor wafer, and accordingly some embodiments can be designed to minimize unused area of a single wafer or to have separate sensor wafers for each camera disposed on a common substrate. Accordingly, in some embodiments the sensors 630 may be fabricated on more than one silicon wafer (for example, each fabricated on a separate silicon wafer) and then the sensors may be disposed on a common structure. In some embodiments the structure is planar. Disposing the sensors on a common structure may help to align the multiple imaging systems.

Figure 6C:
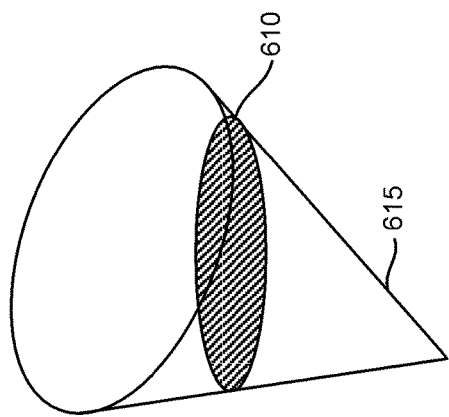
FIG. 6C illustrates an example side view of a camera field of view for the array camera of FIG. 6A.
Figure 6D:
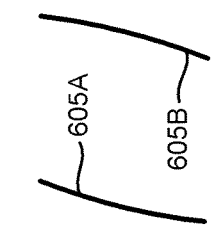
FIG. 6D illustrates example side views of reflector embodiments for the array camera of FIG. 6A.
Figure 6B:
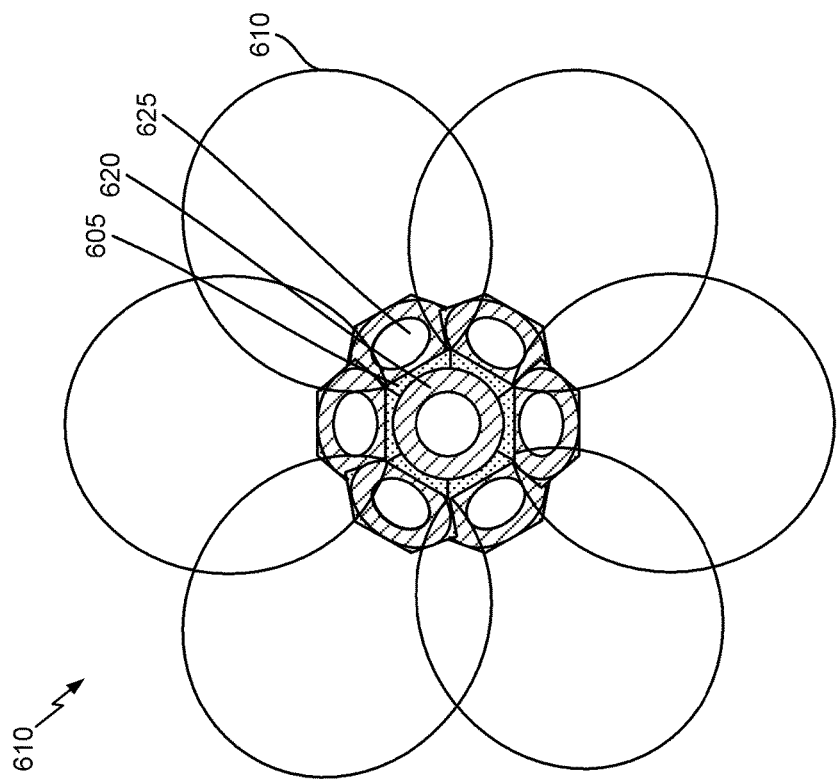
FIG. 6B illustrates an example of a top view of the array camera arrangement depicted in FIG. 6A.

FIG. 6B illustrates an example of a top view of the array camera arrangement depicted in FIG. 6A without showing the camera lens bodies or sensor areas. The elliptic patterns 610 represent, for illustrative purposes, FOV's of the peripheral cameras 625 that are caused by a planar target cutting through the FOV cones of the tilted peripheral cameras 625.

FIG. 6C illustrates an example side view of a cone of rays 615 corresponding to a camera field of view for a peripheral camera 625 the array camera of FIG. 6A. One example elliptic pattern 610 is illustrated within the cone of rays 615.

FIG. 6D illustrates example side views of reflector embodiments for the array camera of FIG. 6A. In some embodiments the mirror surfaces 605A or 605B are flat (planar). However, the mirror surfaces 605A or 605B do not have to be flat. Instead, in some embodiments the mirror surfaces can have a concave shape 605A or a convex shape 605B.

Some examples can be designed to address certain focusing issues and considerations for tilted cameras. For example, peripheral cameras 625 that are tilted with respect to the central camera potentially could present challenges with respect to the light field between the back focal length of the lens and the sensor being tilted with respect to the optical axis of the entire camera array assembly. If a flat test chart is placed near the tilted lens then one could expect the depth of field to be narrow. Once focused one may observed the center to be in focus and the edges to be out of focus. One optical solution may be tilting the light field to be more parallel to the camera array optical axis.

One advantage of the center camera 620 is it does not have this tilt issue. The field of view of the center camera 620, even when the array is constrained by the thin form factor of a mobile device, can be wide enough to, for example, completely image a business card located at 10 cm or further from the array. In this case, the business card will typically not be imaged by the surrounding tilted cameras 625, and hence the titled lens focusing problem may not significantly reduce the quality of the final stitched image when the primary object is imaged by the central camera 620.

Figure 7:
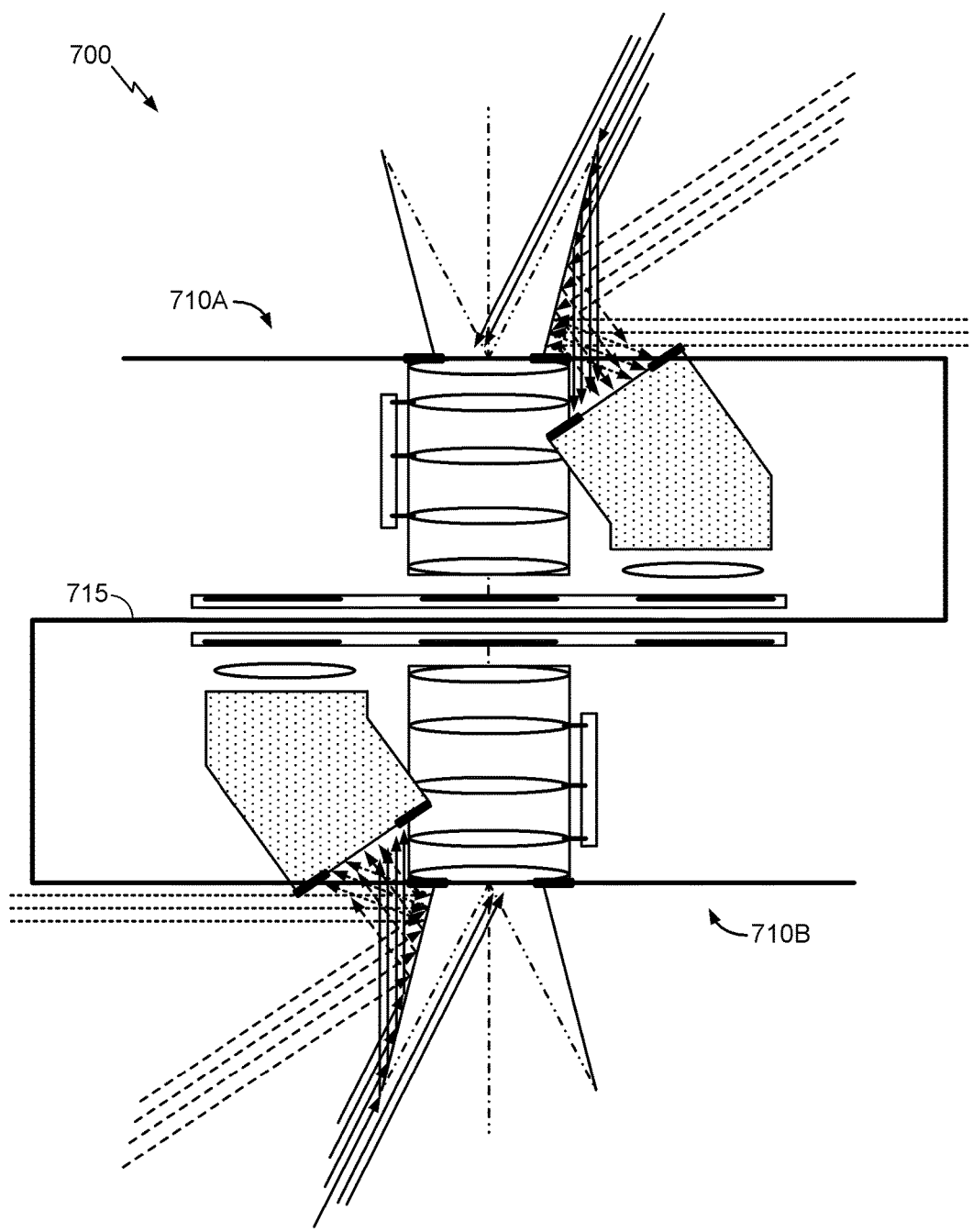
FIG. 7 illustrates an example of an embodiment of a globe camera that includes arranging two hemispherical cameras back-to-back where one camera is facing the rear of a mobile phone and the other camera is facing the front of the mobile phone.

FIG. 7 illustrates an example of an embodiment of a global or full spherical field of view array camera 700. The global array camera 700 includes arranging two hemispherical cameras 710A and 710B back-to-back to capture opposing hemispherical fields of view. In some embodiments including the illustrated embodiment, the two hemispherical cameras 710A and 710B may be the hemisphere array cameras described in reference to FIGS. 3B and 3C. The opposing hemispherical fields of view from the cameras 710A and 710B can then be stitched together to form a full spherical image. In the illustrated example, the two arrays share a common camera housing surface 715, however this surface can be omitted in other embodiments where the sensor substrates or another material supporting the sensors is shared in common between the cameras 710A, 710B. In some embodiments, the two cameras do not have to be aligned exactly back-to-back and any aberration resulting at the seam, or as a result of the two cameras not being exactly aligned, can be corrected or minimized during post-processing of the images.

In some embodiments of the spherical array camera 700 there may be parallax artifacts between the hemispherical images captured by the two array cameras 710A and 710B. Rotating the cameras 710A and 710B vertically relative to the user can help alleviate such parallax artifacts. For example, this can be accomplished by rotating the spherical array camera 700 so the surface or plane 715 where the two hemispheres meet is vertical relative to a user standing upright with one camera facing the user and the other camera facing away from the user (if held in typical imaging posture in front of the user). Images captured in this orientation way would be suitable to view with virtual reality glasses, with parallax stitching artifacts possibly observed only when a user looks right or left about the global scene.

In one example, when implemented in a mobile phone, one camera is positioned facing the rear of a mobile phone and the other camera is positioned facing the front of the mobile phone. As such, both the rear facing and the front facing cameras on the mobile phone would produce high resolution and wide field of view images, in contrast to current typical mobile phone camera configurations where the front facing camera produces significantly lower resolution images than the rear facing camera.

Although real and imperfect mirrors may cause darkening in captured images using any of the hemispherical or spherical array camera embodiments described herein, such darkening should be constant across all images captured by the array using the imperfect mirror. Accordingly, in some embodiments post-capture processing techniques can be used to correct for the known darkening of the image due to the mirror, for example by multiplying the captured image by a mask of the known darkened regions. The result would appear as if it was captured by an ideal mirror with sharp edges and a sharp apex.

IV. Implementing Systems and Terminology

Implementations disclosed herein provide systems, methods and apparatus for wide field of view (e.g., hemispheric or spherical) array cameras free from parallax and tilt artifacts. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, and the like.

The wireless communication device may include one or more image sensors, image signal processor(s), and a memory including instructions or modules for carrying out the processes discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An image capture system for capturing wide field-of-view images, comprising:
   a first imaging system, comprising:
      a first aperture;
      a first center camera positioned to receive light through the first aperture, the first center camera having an optical axis that extends through the aperture;
      a first plurality of periphery cameras arranged around the first center camera and pointed towards a portion of the optical axis of the first center camera; and
      a first plurality of extendible reflectors configured to move from a first position to a second position, the first imaging system having a first FOV with the first plurality of extendible reflectors in the first position and having a second FOV with the first plurality of extendible reflectors in the second position, the second FOV being larger than the first FOV, the second position being closer to the optical axis of the first center camera, the first plurality of periphery cameras and the first plurality of extendible reflectors arranged relative to each other such that that at least a portion of light reflected from one of the first plurality of extendible reflectors enters a corresponding one of the first plurality of periphery cameras when the first plurality of extendible reflectors are in the second position.

2. The system of claim 1, further comprising a processor configured to create a hemispherical image using an image generated from the first center camera and an image from each of the first plurality of periphery cameras that was captured when the first plurality of extendible reflectors are positioned in the second position.

3. The system of claim 1, wherein the first plurality of extendible reflectors each comprise a mirrored first surface that faces away from the optical axis of the first center camera.

4. The system of claim 3, wherein the first plurality of extendible reflectors each comprise a second black surface that faces towards the optical axis of the first center camera.

5. The system of claim 3, wherein the mirrored first surface of the one of the first plurality of extendible reflectors reflects the at least a portion of the light reflected toward the corresponding one of the first plurality of periphery cameras when the first plurality of extendible reflectors are in the second position.

6. The system of claim 3, wherein the mirrored first surface each of the first plurality of extendible reflectors is one of a concave or convex surface.

7. The system of claim 1, wherein the one of the first plurality of extendible reflectors comprises a substantially elliptical shape corresponding to a FOV of the corresponding one of the first plurality of periphery cameras.

8. The system of claim 1, wherein each of the first plurality of periphery cameras and the first center camera comprise a lens assembly and an image sensor.

9. The system of claim 8, wherein the image sensor of each of the first plurality of periphery cameras and the first center camera is disposed on a common substrate, the common substrate forming a plane that is substantially orthogonal to the optical axis of the center camera.

10. The system of claim 9, wherein in the first position the first plurality of extendible reflectors are in a retracted configuration such that a reflective surface of each of the first plurality of reflectors is positioned substantially parallel to the substrate.

11. The system of claim 9, wherein in the second position the first plurality of extendible reflectors are in an extended configuration such that a reflective surface of each of the first plurality of reflectors is positioned at an angle parallel to the substrate, the angle having a predetermined value corresponding to producing a value of 180 degrees for the second FOV.

12. The system of claim 11, wherein at least a portion of rays approaching the optical axis of the first center camera in a direction parallel to the substrate are reflected off of the first plurality of extended reflectors toward the first plurality of periphery cameras when the first plurality of extendible reflectors are in the second position.

13. The system of claim 1, further comprising:
   a second imaging system, comprising:
      a second aperture;
      a second central camera positioned to receive light through the second aperture, the second center camera having an optical axis that extends through the second aperture;
      a second plurality of periphery cameras arranged around the second center camera and pointed towards a portion of the optical axis of the second center camera; and
      a second plurality of extendible reflectors configured to move from a third position to a fourth position, the second imaging system having the first FOV with the second plurality of extendible reflectors in the third position and having the second FOV with the second plurality of extendible reflectors in the second position, the fourth position being closer to the optical axis of the second center camera than the third position, the second plurality of periphery cameras and the second plurality of extendible reflectors arranged relative to each other such that that at least a portion of light reflected from one of the second plurality of additional extendible reflectors enters a corresponding one of the second plurality of periphery cameras when the second plurality of extendible reflectors are in the fourth position.

14. The system of claim 13, wherein the second FOV of each of the first and second imaging systems is hemispherical-shaped and looks at a substantially different image scene than the hemispherical-shaped FOV of the other of the first and second imaging systems.

15. The system of claim 14, wherein the first and second imaging systems are disposed in a back-to-back arrangement such that a total FOV comprising a combination of the second FOV of each of the first and second imaging systems is spherical-shaped.

16. A method for capturing using a single array camera a standard field-of-view image or a wide field-of-view image, comprising:
   controlling the positioning of a plurality of extendible reflectors positioned around a center camera, a plurality of periphery cameras also positioned around the center camera and each associated with one of the plurality of extendible reflectors, the center camera having an optical axis and the plurality of periphery cameras pointed toward a portion of the optical axis;
   determining whether to capture the standard field-of-view image or the wide field-of-view image, the wide field-of-view image covering a greater field than the standard field-of-view image;
   in response to determining to capture the standard field-of-view image:
      positioning the plurality of extendible reflectors in a first position, and
      capturing the standard field-of-view image using the center camera; and
   in response to determining to capture the wide field-of-view image:
      positioning the plurality of extendible reflectors in a second position such that at least a portion of light reflected from one of the plurality of extendible reflectors enters an associated one of the plurality of periphery cameras,
      capturing a central portion of the wide field-of-view image using the center camera, and
      capturing a plurality of periphery portions of the wide field-of-view image using the plurality of periphery cameras.

17. The method of claim 16, wherein, in response to determining to capture the standard field-of-view image, the method further comprises combining the central portion and the plurality of periphery portions into the wide field-of-view image.

18. The method of claim 16, wherein the central portion of the wide field-of-view image comprises a portion of the standard field-of-view image.

19. The method of claim 16, wherein positioning the plurality of extendible reflectors in the first position comprises retracting the plurality of extendible reflectors against a camera housing containing the center camera and the plurality of periphery cameras.

20. The method of claim 16, wherein positioning the plurality of extendible reflectors in the second position comprises angling the plurality of extendible reflectors relative to a camera housing containing the center camera and the plurality of periphery cameras such that a reflective surface of each of the plurality of extendible reflectors directs light representing the plurality of periphery portions toward the plurality of periphery cameras.

21. A non-transitory computer-readable medium storing instructions that, when executed, cause one or more processors to perform operations comprising, for controlling the positioning of a plurality of extendible reflectors positioned around a center camera and each associated with one of a plurality of periphery cameras also positioned around the center camera:
   determining whether to capture a standard field-of-view image or a wide field-of-view image, the wide field-of-view image covering a greater field than the standard field-of-view image;
   in response to determining to capture the standard field-of-view image:
      generating first instructions to position the plurality of extendible reflectors in a first position, and
      receiving first image data comprising the standard field-of-view image from the center camera; and
   in response to determining to capture the wide field-of-view image:
      generating second instructions to position the plurality of extendible reflectors in a second position such that at least a portion of light reflected from one of the plurality of extendible reflectors enters an associated one of the plurality of periphery cameras, and
      receiving second image data comprising a central portion of the wide field-of-view image from the center camera and a plurality of periphery portions of the wide field-of-view image from the plurality of periphery cameras.

22. The non-transitory computer-readable medium of claim 21, wherein, in response to determining to capture the wide field-of-view image, the operations further comprise combining the central portion and the plurality of periphery portions into the wide field-of-view image.

23. The non-transitory computer-readable medium of claim 21, wherein generating the first instructions comprises generating instructions for an actuator associated with at least one extendible reflector of the plurality of extendible reflectors to position the at least one extendible reflector in a retracted configuration substantially against a camera housing containing the center camera and the plurality of periphery cameras.

24. The non-transitory computer-readable medium of claim 21, wherein generating the second instructions comprises generating instructions for an actuator associated with an extendible reflector of the plurality of extendible reflectors to position the extendible reflector in an extended configuration such that a reflective surface of the extendible reflector directs light representing one of the plurality of periphery portions toward an associated camera of the plurality of periphery cameras.

25. An apparatus for capturing a standard field-of-view image or a wide field-of-view image, the apparatus comprising:
   housing means having at least an upper surface and a lower surface spaced apart from the upper surface;
   image sensing means positioned between the upper surface and the lower surface;
   light focusing means positioned below a first aperture in the upper surface of the housing means and above a central sensing area of the image sensing means;
   a plurality of additional light focusing means positioned around the first light focusing means and below a corresponding plurality of additional apertures in the upper surface of the housing means and above a plurality of additional sensing areas of the image sensing means; and
   a plurality of light reflecting means positioned around the first aperture above the first lens assembly, each of the plurality of light reflecting means associated with one of the plurality of additional light focusing means.

26. The apparatus of claim 25, the first light focusing means having an optical axis, wherein an optical axis of each of the plurality of additional light focusing means is positioned to intersect with the optical axis of the first light focusing means.

27. The apparatus of claim 25, further comprising actuating means for transitioning the plurality of light reflecting means between a first position corresponding to the standard field-of-view image and a second position corresponding to the wide field-of-view image.

28. The apparatus of claim 25, further comprising processing means in communication with the image sensing means.

29. The apparatus of claim 28, further comprising instructions provided to the processing means to combine image data from the central sensing area and the plurality of additional sensing areas into the wide field-of-view image.

30. The apparatus of claim 28, further comprising instructions provided to the processing means to generate instructions that configure actuating means to transition the plurality of extendible reflectors between a first position corresponding to the standard field-of-view image and a second position corresponding to the wide field-of-view image.

\* \* \* \* \*